United States Patent [19]
Kawanishi et al.

[11] Patent Number: 5,706,113
[45] Date of Patent: Jan. 6, 1998

[54] PHASE LOCK LOOP CIRCUIT USING OPTICAL CORRELATION DETECTION

[75] Inventors: Satoki Kawanishi, Zushi; Osamu Kamatani, Sagamihara; Masatoshi Saruwatari, Yokosuka, all of Japan

[73] Assignee: Nippon Telegraph and Telephone Corporation, Tokyo, Japan

[21] Appl. No.: 658,414

[22] Filed: Jun. 5, 1996

Related U.S. Application Data

[62] Division of Ser. No. 389,486, Feb. 16, 1995, Pat. No. 5,574,588.

[30] Foreign Application Priority Data

Feb. 23, 1994 [JP] Japan .................................. 6-025750
Feb. 23, 1994 [JP] Japan .................................. 6-025751

[51] Int. Cl.$^6$ .................................................. H04B 10/00
[52] U.S. Cl. .......................... 359/158; 359/110; 359/135; 375/294
[58] Field of Search ............................ 359/127, 158, 359/135, 161, 187, 173, 338, 110; 385/122; 375/294, 327, 376

[56] References Cited

U.S. PATENT DOCUMENTS 5,457,559  10/1995  Saito et al. ..................... 359/135

OTHER PUBLICATIONS

S. Kawanishi et al., 100 Gbit/s, 50km, and Nonrepeated Optical Transmission Employing All-Optical Multi-Demultiplexing and PLL Timing Extraction, Electronics Letters, vol. 29, No. 12, pp. 1075-1076, Jun. 10, 1993.

S. Kawanishi et al., Ultra-High-Speed PLL-Type Clock Recovery Circuit Based on All-Optical Gain Modulation in Traveling-Wave Laser Diode Amplifier, Journal of Lightwave Technology, vol. 11, No. 12, pp. 2123-2129, Dec. 1993.

H. Takara et al., Ultra High-Speed Optical Waveform Measurement Method Using Optical Sampling with Sum-Frequency Generation, B-I, vol. J75-B-I No. 5, pp. 372-380, May 1992.

*Primary Examiner*—Kinfe-Michael Negash
*Attorney, Agent, or Firm*—Finnegan, Henderson, Farabow, Garrett & Dunner, L.L.P.

[57] ABSTRACT

It is an object of the present invention to provide an optical clock phase lock loop capable of a higher operational speed than the conventional technology by utilizing high-speed optical phenomena other than gain modulation. In an optical clock phase lock loop for conducting locking control by means of obtaining the correlation of an optical signal and optical clock, after combining an optical clock of a short pulse containing a harmonics component with an optical signal by means of an optical coupler 102, and providing the resultant light to traveling-wave semiconductor laser amplifier 103, the correlation signal of the optical signal and optical clock included in the output signal of this traveling-wave semiconductor laser amplifier 103 is detected by means of optical bandpass filter 104.

7 Claims, 19 Drawing Sheets

PHASE LOCK LOOP CIRCUIT USING OPTICAL CORRELATION DETECTION

This is a division of application Ser. No. 08/389,486, filed Feb. 16, 1995 now U.S. Pat. No. 5,574,588.

BACKGROUND OF THE INVENTION

1. Field of the Invention

The present invention relates to an optical clock phase lock loop circuit and an optical correlation detection circuit which is ideal for constructing this optical clock phase lock loop circuit, both of which are used for locking the frequency and phase of the clock in optical repeaters, optical terminal units, and optical signal processing of ultra-high-speed optical transmissions.

2. Relevant Art

FIG. 10 is a diagram showing a structural example of a conventional optical clock phase lock loop circuit. In this Figure, an optical signal input terminal 601, optical coupler 602, traveling-wave semiconductor laser amplifier 603, optical bandpass filter 604, optical receiving circuit 605, phase comparator 606, voltage-controlled oscillator 607 (hereinafter referred to as "VCO"), micro-wave mixer 608, optical pulse generator 609, optical pulse multiplexer 610, low frequency transmitter 611, and frequency multiplier 612 are provided. The oscillation frequency of VCO 607 is denoted by $f_0$, and the value of this oscillation frequency $f_0$ is set such that the bit rate of the optical signal inputted from optical signal input terminal 601 becomes $nf_0$ (n is an integer of 1 or greater).

In the following, a concrete construction of the optical pulse multiplexer will be explained. FIG. 11 is a structural diagram of 2× optical pulse multiplexer using an optical fiber. In this Figure, input terminal 701, optical fiber coupler 702, optical fiber delay line 703, optical fiber coupler 704, and output terminal 705 are provided. In this structure, the clock optical pulse entering from input terminal 701 is divided into two by means of optical fiber coupler 702. One of these divided clock optical pulses is delayed by $T/2+mT$ (T is the time slot of the input clock optical pulse=$1/f_0$, and m is an integer) by means of optical fiber delay line 703 and then coupled again by means of optical fiber coupler 704 such that a repetition frequency of 2× (multiplied by two) optical clock is formed. In the above case, the repetition frequency of the optical clock formed becomes $2\times(f_0+\Delta f)$. In the case when the multiplicity of the clock is greater than 2, the aforementioned multiplexer is connected in a multi-stage manner. The multiplicity of the clock then becomes $2^K$ by means of a connection of k stages. However, in this case, the delay amount of the optical fiber delay line used in the kth multiplexer from the incident side is $(T/2^K+mT)$.

FIG. 12 is a structural diagram showing a three-stage 8× optical pulse multiplexer using an optical wave guide. In this Figure, an input terminal 801, optical combining/splitting device 802, optical waveguides 803 and 804, optical splitter 805, optical waveguides 806 and 807, optical combining/splitting device 808, optical waveguides 809 and 810, optical combining/splitting device 811, and output terminal 812 are provided. This circuit is constructed by means of integrating the functions explained using FIG. 11 onto a silicon substrate. The functions are the same as those of the structure shown in FIG. 11; however, due to monolithic integration, the present circuit exhibits a compact nature and stable operation not affected by fluctuations of the temperature and the like. An example in which optical pulse multiplexing is achieved using the present circuit is described in S. Kawanishi, et al. ("100 Gbit/s, 50 km, and Non-Repeated Optical Transmission Employing All-Optical Multi/Demultiplexing and PLL Timing", Electronics Letters, vol. 29, pp. 1075–1076, 1993).

In the following, the actions of a conventional optical clock phase lock loop circuit shown in FIG. 10 will be explained. The output signal of VCO 607 undergoes a frequency shift to $(f_0+\Delta f)$ by means of low frequency oscillator 611 and microwave mixer 608. Optical pulse generator 609 is then driven by means of the signal undergoing the above frequency shift. As a result, an optical clock in which the repetition frequency is $(f_0+\Delta f)$ is generated from optical pulse generator 609. The optical clock generated from optical pulse generator 609 as described above is multiplexed by means of optical pulse multiplexer 610 shown by means of either of the structures in FIG. 11 or FIG. 12 and is outputted as a multiplexed clock in which the repetition frequency is n× (n is a natural number). The optical clock multiplexed by means of optical clock pulse multiplexer 610 is combined with an optical signal pulse from optical signal input terminal 601 by means of passing through optical coupler 602, and then enters traveling-wave semiconductor laser amplifier 603. At this time, when $n=2^K$ is designated in order for the frequency of the clock following multiplexing to reach a frequency $2^K(f_0+\Delta f)$ corresponding to the bit rate $nf_0$ of the optical signal, even when the optical signal pulse is a completely random modulation signal, the $n\Delta f$ component, which serves as the correlation of the optical signal pulse and optical clock, is generated by means of these two lights.

In the following, the actions of traveling-wave semiconductor laser amplifier 603 which serves as an optical modulation device will be explained. The wavelength $\lambda_{sig}$ of the optical signal entering the traveling-wave semiconductor laser amplifier 603 and the wavelength $\lambda_{clk}$ of the optical clock are apart from each other to a degree such that coherent interference is not generated. In this case, when an optical clock possessing an optical intensity of a certain degree enters the traveling-wave semiconductor laser amplifier, the carrier within traveling-wave semiconductor laser amplifier 603 is modulated. Modulation of this carrier means that the gain of traveling-wave semiconductor laser amplifier 603 is modulated with respect to an optical signal which serves as another optical input. The principles of this modulation are described in detail in Kawanishi, S. et al. ("Ultra-high-speed PLL-type clock recovery circuit based on all-optical gain modulation in traveling-wave laser diode amplifier"; IEEE Journal of Light Wave Technology, vol. 11, pp. 2123–2129; 1993).

As described above, the correlation component of both lights is included in the optical signal wherein the gain is modulated by means of the above optical clock. As a result, this optical signal is extracted by means of optical bandpass filter 604, converted into an electrical signal by means of optical receiving circuit 605, and compared with a standard signal by means of phase comparator 606. PLL operation is then achieved by means of conducting feedback of this output to VCO 607.

In the following, the principle operation of this PLL is explained. Initially, the optical signal (repetition frequency $nf_0$) inputted from optical signal input terminal 601 is combined with a multiplexed optical clock via optical coupler 602, and inputted into traveling-wave semiconductor laser amplifier 603. For the sake of simplicity, the optical signal pulse and clock are both sine waves, and are respectively expressed by Ps(t) and Pc(t) in the formulae below.

$$Ps(t)=Ps\{1+\sin n\ (2\pi f_0 t+\phi(t))\} \qquad (1)$$

$$Ps(t) = Ps\{1+\sin 2\pi n\ (f_0+\Delta f)\ t)\} \quad (2)$$

In the formulae, Ps and Pc are constants. In addition, φ(t) represents the phase difference (the reciprocal time difference of pulse positions) between the optical signal pulse and the optical clock. This φ(t) represents the control objective of PLL, and should be set to 0 or a constant value.

Hence, the optical signal and optical clock enter traveling-wave semiconductor laser amplifier 603 and undergo gain modulation. At this time, among the light outputted from traveling-wave semiconductor laser amplifier 603, $P_{sout}$ and $P_{cout}$ correspond to the aforementioned optical signal and optical clock, respectively. $P_{sout}$ and $P_{cout}$ are expressed by the following formulae.

$$P_{sout} = G \cdot Ps\ [1+\sin n\ \{2\pi f_0 t+\phi(t)\}] \cdot [1+m(Pc)\\ \sin \{2\pi(f_0+\Delta f)\ t+\pi\}] \quad (3)$$

$$P_{cout} = G \cdot Pc\ [1+\sin 2\pi n(f_0+\Delta f)] \cdot [1+m(Ps)\ \sin n\ \{2\pi f_0 t+\phi(t)+\pi\}] \quad (4)$$

In the above formulae, G represents the unsaturated gain of traveling-wave semiconductor laser amplifier 603, and m(Pc) and m(Ps) represent the degree of gain modulation from the optical clock and optical signal, respectively.

At the time when the clock optical pulse intensity reaches the peak, the number of carriers within traveling-wave semiconductor laser amplifier 603 is minimized. Consequently, the phase of the gain modulation within the traveling-wave semiconductor laser amplifier 603 differs from the phase of the incident optical clock by π. Hence, this phase difference π is added as shown in formulae (3) and (4). Among the optical signal and optical clock outputted from the gain modulated traveling-wave semiconductor laser amplifier 603, only the optical signal is extracted by means of optical filter 604. Since the gain band width (wavelength conversion) of traveling-wave semiconductor laser amplifier 603 is approximately 50 nm, it is possible to extract only one light by means of optical filter 604 by sufficiently separating the wavelengths of the optical signal and optical clock within the aforementioned band. The optical signal extracted by means of optical filter 604 is inputted into optical receiving circuit 605. The photocurrent Os(t) at the time of using PIN-PD as the optical receiving component of optical receiving circuit 605 is shown in the following.

$$Os(t) = (e\eta/hv) \cdot G \cdot Ps \cdot \quad (5)\\ [1 + m(Pc)\ \{\sin 2\pi n(f_0 + \Delta f)t + \pi\} +\\ \{\sin n(2\pi f_0 t + \phi(t))\} -\\ (1/2)m(Pc)\cos\{2\pi n(2f_0 + \Delta f)t + n\phi(t) + \pi\} +\\ (1/2)m(Pc)\cos\{2\pi n\Delta f t - n\phi(t) + \pi\}$$

In the above formula, e represents the electron charge, η represents the quantum efficiency of PIN-PD, and hv represents the energy of the photons. The last item of formula (5) is the nΔf component generated by means of correlation with the optical clock, and thus, the fluctuation of the phase difference between the optical signal pulse and the optical clock pulse is replaced by the fluctuation of this nΔf component. PLL operation is then accomplished by means of conducting a phase comparison of this nΔf output and the Δf output of the original oscillator with a n-multiplied nΔf reference signal, and then conducting feedback to VCO 607.

The actual experimental results can be found in the reference, (S. Kawanishi, et at., "Ultra-high-speed PLL-type clock recover circuit based on all-optical gain modulation in traveling-wave laser diode amplifier"; IEEE Journal of Light Wave Technology, vol. 11, pp. 2123–2129, 1993). At this point, since the phase comparison is conducted using the nΔf component, the phase comparison output is in proportion to nΔφ. Consequently, during operation of PLL, when nΔφ is 0, the feedback signal to VCO 607 becomes 0, and the power fluctuation of the input optical signal is unaffected. By setting nΔf to a value of approximately several 100 kHz, high-speed operation is not required in the electrical phase comparator 606, and thus, overall, a high-speed PLL operation can be anticipated.

However, in the above-described conventional PLL circuit, the following two problems exist.

Problem 1

As a method for conducting correlation detection of an optical signal pulse and optical clock pulse, gain modulation of a traveling wave semiconductor laser amplifier is widely used. However, the modulation efficiency therein depends on the frequency as shown in formulae (3) and (4); more concretely, this efficiency is reduced in a manner inversely proportional to the square of the frequency. In the calculation described in S. Kawanishi et al. ("Ultra-high-speed PLL-type clock recover circuit based on all-optical gain modulation in traveling-wave laser diode amplifier"; IEEE Journal of Light Wave Technology, vol. 11, pp. 2123–2129, 1993), the upper limit of the operational speed of PLL using gain modulation of a traveling-wave semiconductor laser amplifier is approximately 100 GHz. Achieving an operational speed greater than this upper limit is considered to be technically difficult.

Problem 2

As a method for conducting correlation detection of an optical signal pulse and optical clock pulse, a method in which the speed of the clock is multiplied using an optical pulse multiplexer in order to match the speed of the clock pulse with the bit rate $nf_0$ of the optical signal pulse is employed. However, according to this method, not only is the structure of the apparatus involved extremely complex, but also due to the operational principles of the optical time-division-multiplexing circuit, the clock frequency is fixed. The variable range of the clock frequency is at most approximately 5%; any attempts to vary the clock frequency more than this aforementioned amount results in the generation of jitters (fluctuations) in the clock multiplexing, which in turn leads to the malfunctioning of the PLL. Furthermore, according to the structure shown in FIG. 12, only multiples of $2^K$ can be handled, i.e., 2, 4, 8, 16 . . ., and thus, optical clock multiplication of multiples of random integers is difficult.

SUMMARY OF THE INVENTION

In consideration of the aforementioned, it is an object of the present invention to provide an optical clock phase lock loop circuit capable of high-speed operation, which solves the aforementioned Problem 1 and Problem 2.

Therefore, in order to solve the aforementioned Problem 1, the present invention comprises as a method for conducting correlation detection of an optical signal pulse and optical clock pulse, ultra-high-speed PLL using a high-speed optical phenomenon faster than that produced by gain modulation by means of four-wave mixing in traveling-wave semiconductor laser amplifier, optical fibers and the like, and sum-frequency generation in nonlinear optical crystal.

More concretely, the present invention provides an optical clock phase lock loop comprising:

first oscillating means in which an oscillation frequency and phase vary according to exterior control;

second oscillating means for outputting an a.c. signal;

frequency mixing means for generating, by means of mixing an output signal of said first oscillating means and an output signal of said second oscillating means, a signal of a frequency corresponding to a sum, difference, or sum and difference of frequencies of said output signals;

optical pulse generating means for generating an optical pulse of a repetition frequency equal to the frequency of an output signal of said frequency mixing means;

optical multiplexing means for conducting optical time-division-multiplexing of said optical pulse, and for multiplying said repetition frequency by n (n is a natural number);

optical correlation detecting means for outputting the product of light intensities of an optical signal pulse and an optical clock pulse outputted from said optical multiplexing means;

optical receiving means for converting an optical output of said optical correlation detecting means into an electrical signal; and means for controlling a phase of said first oscillating means by comparing a phase of said electrical signal outputted from said optical receiving means and a phase of said signal produced by multiplying said standard signal by n, such that said phase difference of said signals results in a predetermined value;

wherein, said optical correlation detecting means is formed from a optical combining means for combining said optical signal pulse and said optical clock pulse; traveling-wave semiconductor laser amplifying means for amplifying a signal produced by said combination; and optical splitting means for extracting from an optical output signal of said traveling-wave semiconductor laser amplifying means only the wavelength of said four-wave mixing light which is a correlation component of said optical signal pulse and said optical clock pulse;

said oscillation frequency of said first oscillating means is set to 1/n of the bit rate of said optical signal pulse, and said wavelengths of said optical signal and optical output of said optical pulse generating means are set to values such that said signals coherently interfere with each other.

According to the aforementioned, correlation detection of an optical signal pulse and optical clock pulse is performed using ultrahigh-speed four-wave mixing phenomenon in the traveling-wave semiconductor laser amplifier, and as a result, even when correlation detection from an ultra-high-speed signal is conducted, a clock synchronized to this ultra-high-speed signal can be generated without degrading the mixing of the four-wave mixing.

In addition, in order to solve the aforementioned Problem 2, the present invention achieves ultra-high-speed optical PLL using as the method for detecting the correlation between an optical signal pulse and optical clock pulse, a method for directly detecting a correlation signal between a short optical clock pulse and optical signal pulse, wherein the short optical clock pulse is not subjected to time-division-multiplexing as in the prior art.

More concretely, the optical correlation detecting circuit of optical PLL comprises:

optical combining means for combining an optical signal pulse and an optical clock pulse possessing a sufficiently narrow pulse width for including nth harmonics (n is a natural number) component of a repetition frequency;

traveling-wave semiconductor laser amplifying means for outputting a product of intensities of said optical signal pulse and said optical clock pulse; and optical splitting means for extracting from an optical output signal of said traveling-wave semiconductor laser amplifying means only said correlation component of said optical signal pulse and said optical clock pulse.

In the traveling-wave semiconductor laser amplifying means, gain modulation from the optical clock pulse, or four-wave mixing between the optical clock pulse and optical signal pulse is generated to produce an output containing a correlation signal between both optical pulses. Subsequently, the correlation signal is detected from this output signal by means of the optical splitting means.

In other words, using a short optical clock pulse which does not undergo optical-time-division-multiplexing, the correlation signal between an optical signal and an optical clock is detected by means of ultra-high-speed four-wave mixing and the like. As a result, it is possible to generate a clock synchronized to 1/n of the repetition frequency of an ultra-high-speed optical signal. In addition, according to the present PLL, it is possible to generate a clock and dividing clock synchronized to a randomly modulated optical signal, and thus the present PLL produces superior effects when used in ultra-high-speed optical transmission, signal processing, and the like.

DETAILED DESCRIPTION OF THE INVENTION

In the following, the embodiments of the present invention will be explained with reference to the Figures.

First Embodiment

Figure 1A:
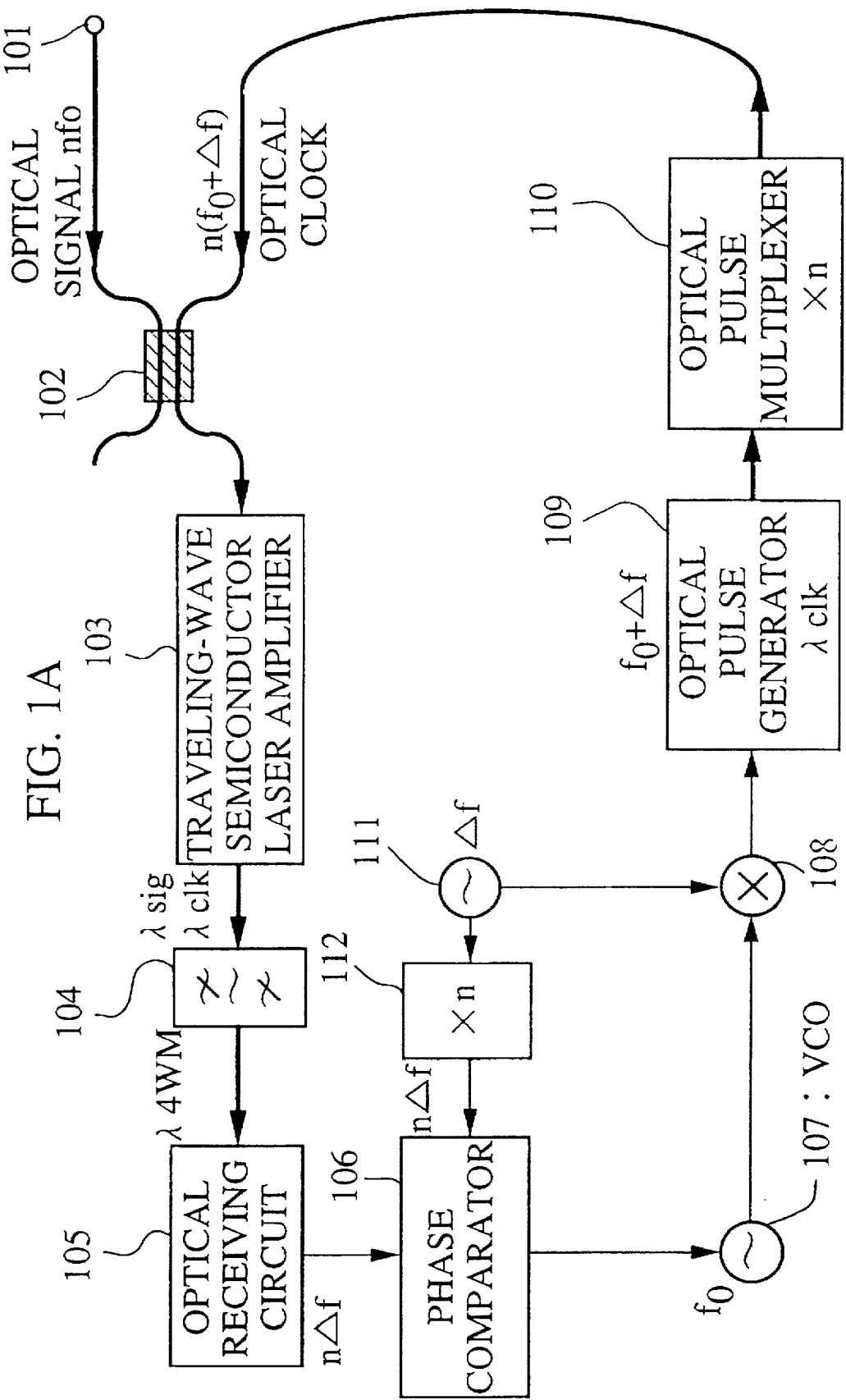
FIG. 1A is a diagram showing a structure according to a first embodiment of the present invention.
Figure 10:
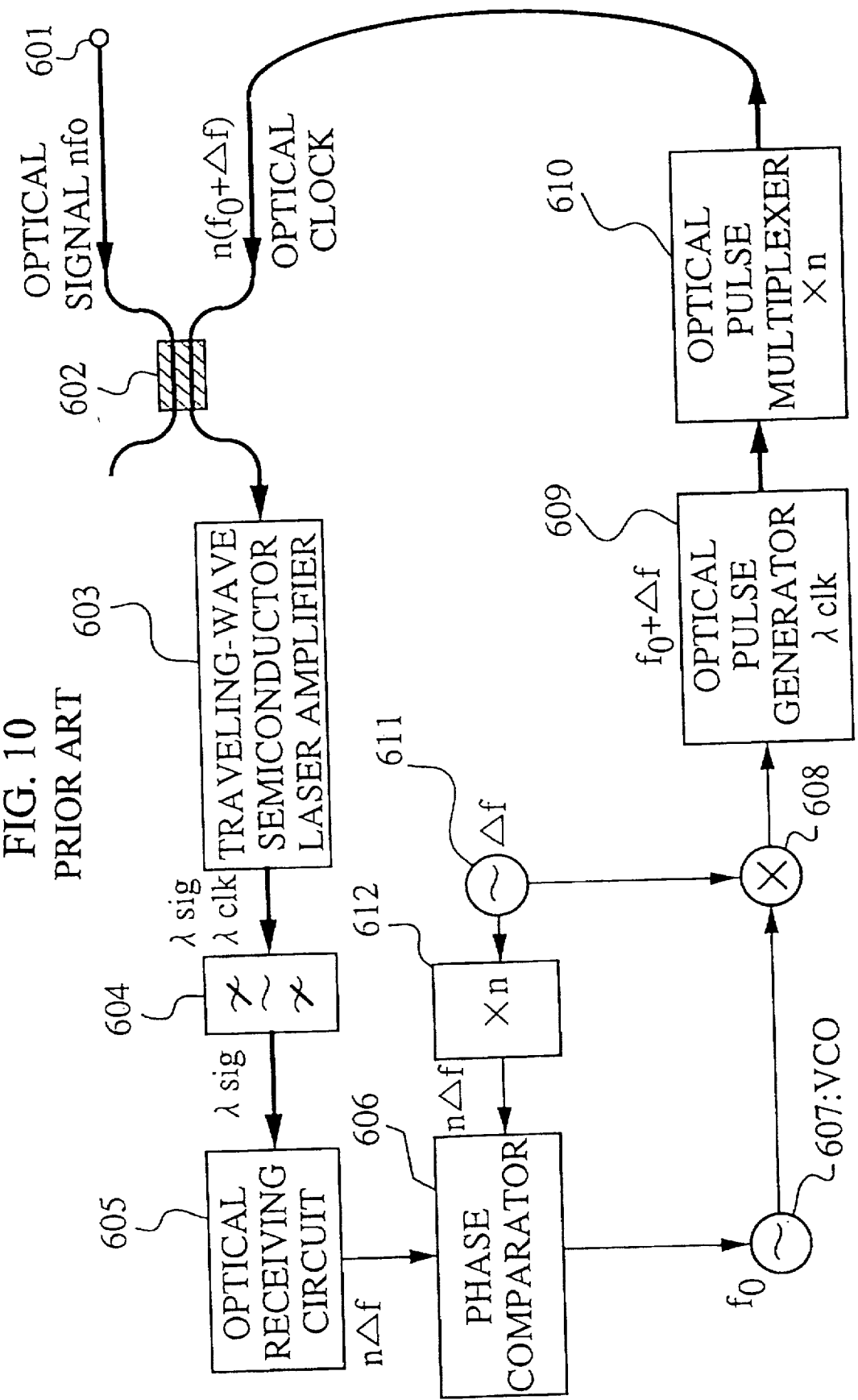
FIG. 10 is a diagram showing a conventional structure.

FIG. 1A is a diagram showing the first embodiment of the present invention. In this Figure, optical signal input terminal 101, optical coupler 102, traveling-wave semiconductor laser amplifier 103, optical bandpass filter 104, optical receiving circuit 105, phase comparator 106, VCO 107, microwave mixer 108, optical pulse generator 109, optical pulse multiplexer 110, low frequency oscillator 111, and frequency multiplier 112 are provided. The oscillation frequency $f_0$ of VCO 107 is set such that the bit rate of the optical signal inputted from optical signal input terminal 101 becomes $nf_0$ (n is an integer of at least 1), as in the structure shown in FIG. 10 above.

In the following, the operation of the present embodiment will be described.

The output signal of VCO 107 undergoes a frequency shift by means of low frequency oscillator 111 and microwave mixer 108. Optical pulse generator 109 is driven by means of this frequency shifted signal, and the output pulse of optical pulse generator 109 is multiplexed by means of optical pulse multiplexer 110 to produce an optical clock in which the frequency is multiplexed. The above actions are similar to those described for the structures shown in FIG. 10.

Figure 2A:
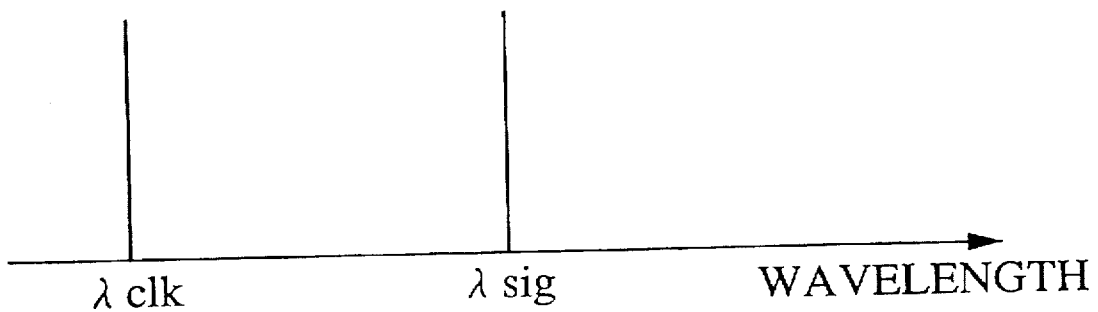
FIG. 2A is a diagram showing the spectrum in the case when the wavelengths of the optical signal and optical clock entering traveling-wave semiconductor laser amplifier are separated according to the same embodiment.
Figure 2B:
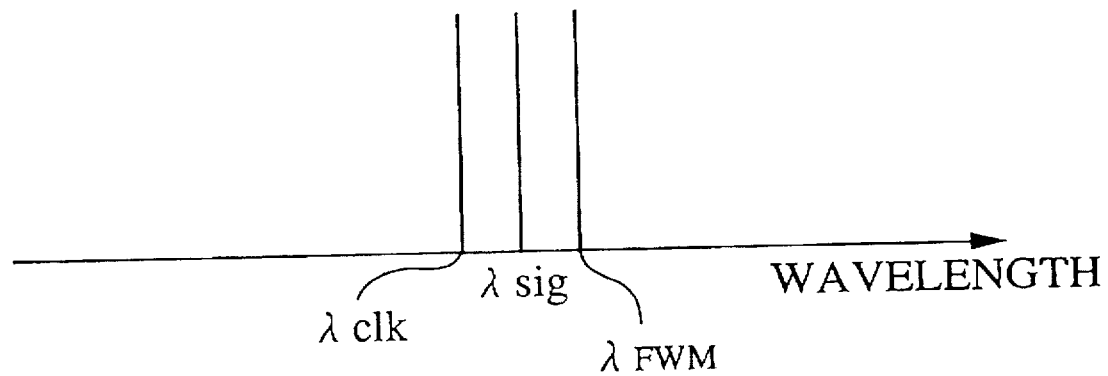
FIG. 2B is a diagram showing the case in which the proximity of the wavelengths is to a degree such that both lights coherently interfere with each other.

In the following, the actions of traveling wave semiconductor laser amplifier 103 which serves as the optical modulation means will be explained. FIGS. 2A and 2B show the relationship between wavelength $\lambda_{sig}$ of an optical signal and wavelength $\lambda_{clk}$ of an optical clock which enter a traveling wave semiconductor laser amplifier 103. FIG. 2A shows the relationship of the optical signal and optical clock according to a conventional technology in the case when the wavelengths of both lights are separated; FIG. 2B shows the case of the present embodiment in which the wavelengths of both lights are in close proximity such that coherent interference is observed. In the case of FIG. 2B, i.e., in the case when the wavelengths $\lambda_{sig}$ and $\lambda_{clk}$ of the aforementioned are close enough such that coherent interference is observed, a component corresponding to the correlation of both light is generated in a new wavelength $\Sigma_{FWM}$ by four-wave mixing between the optical signal and optical clock within the semiconductor laser (Note: $1/\lambda_{FWM}=2/\lambda_{sig}-1/\lambda_{clk}$). The present embodiment utilizes this phenomenon.

The present phenomenon is an ultra-high-speed non-linear optical phenomenon which is, in essence, completely different from that of gain modulation according to the conventional art. A more concrete explanation is contained in Y. R. Shen, "The Principles of Nonlinear Optics", Wiley Interscience, pp. 242–266, 1984. In this manner, the light generated by means of four-wave mixing includes a correlation component (nΔf) of both entities. Therefore, after extracting this four-Wave mixing light by means of an optical band pass filter 104, PLL operation is achieved as described in the conventional art, i.e., by converting into an electrical signal by means of optical receiving circuit 105, comparing a standard signal to an n-multiplied nΔf signal by means of phase comparator 106, followed by feedback of this output to VCO 107.

Figure 1B:
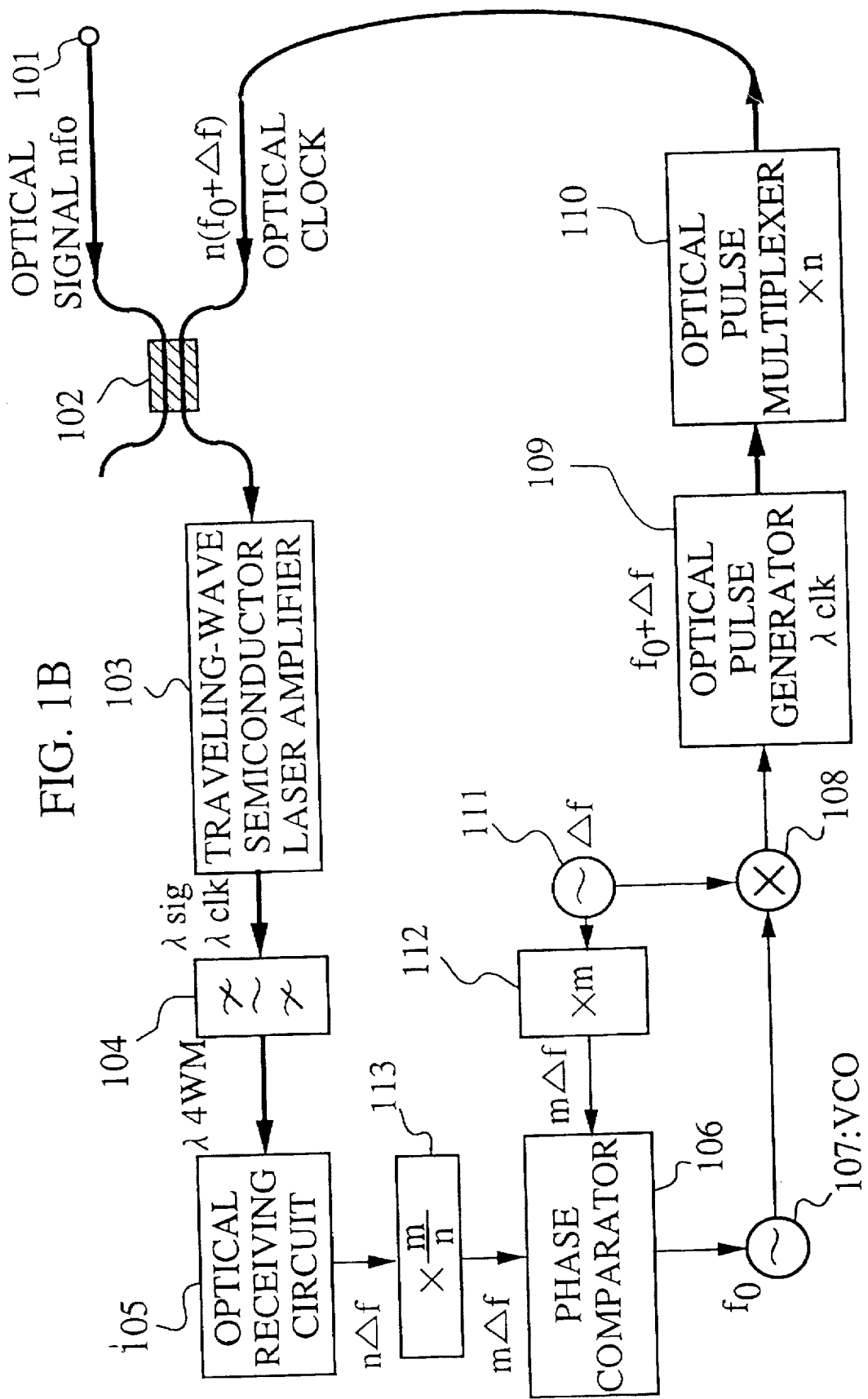
FIG. 1B is a diagram showing another structure according to a first embodiment.

In addition, with regard to the action of phase comparator 106, it is also possible to use the circuit construction shown in FIG. 1B. In FIG. 1B, the output frequency of optical receiving circuit 105 is multiplied by m/n (m is a rational number) by means of dividing circuit 113, and both frequencies to be inputted into phase comparator 106 are compared to the phases of both lights as mΔf by means of multiplying the output of a.c. signal generator 111 by m. At this time, when m=1, frequency multiplying circuit 112 can be omitted, and when m=n, dividing circuit 113 can be omitted.

Modification Example 1

Figure 3A:
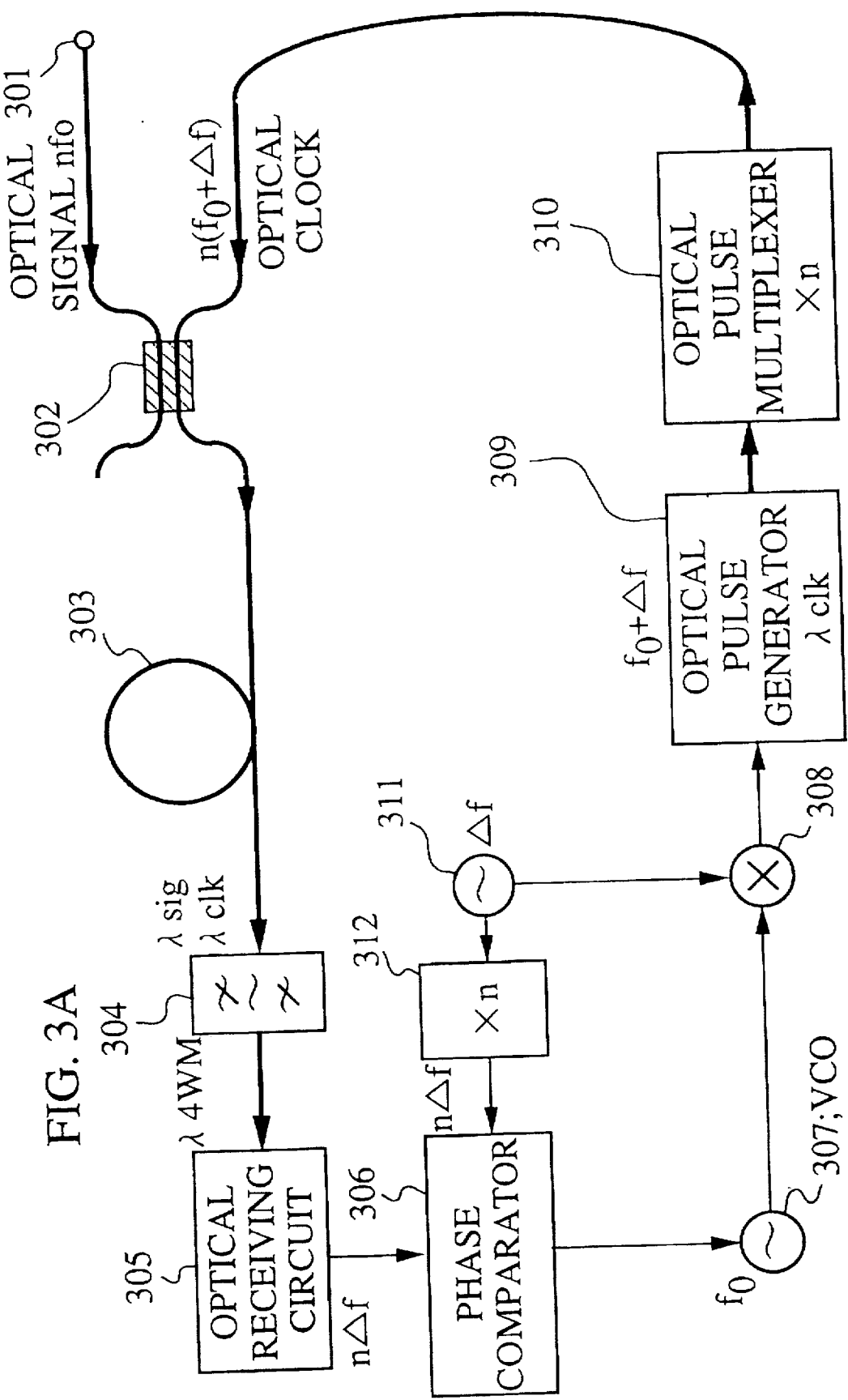
FIG. 3A is a diagram showing a structure of Modification Example 1 according to a first embodiment.

FIG. 3A is a diagram showing a modification of the aforementioned first embodiment. In this Figure, an optical signal input terminal 301, optical coupler 302, optical fiber 303, optical bandpass filter 304, optical receiving circuit 305, phase comparator 306, VCO 307, micro-wave mixer 308, optical pulse generator 309, optical pulse multiplexer 310, low frequency oscillator 311, and frequency multiplier 312 are provided.

In the present Modification Example, optical fiber 303 is used as the medium for generating four-wave mixing. In this optical fiber, the respective wavelengths of the optical signal and optical clock may be set to within ±10 nm of the zero dispersion wavelength of optical fiber 303.

Figure 3B:
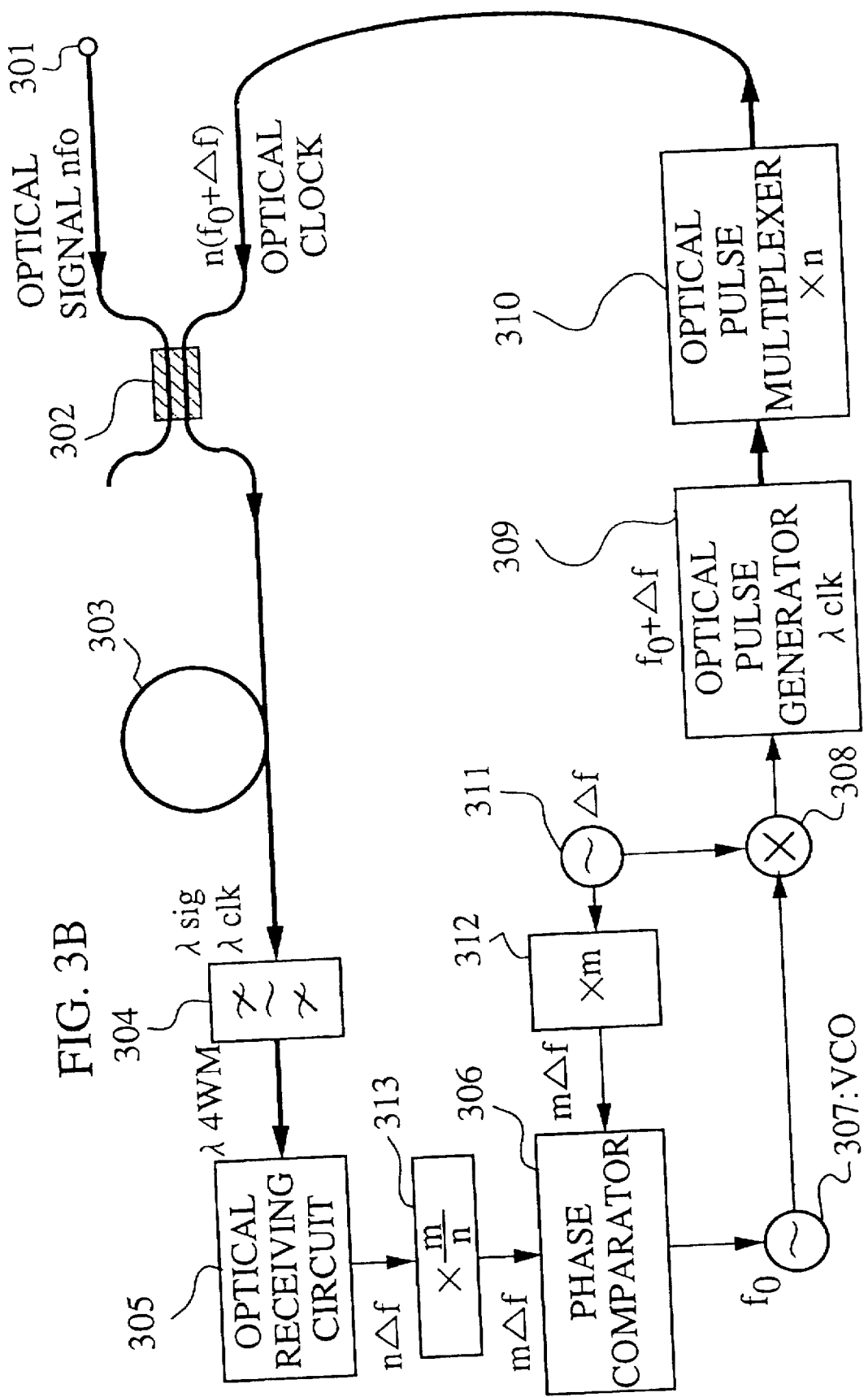
FIG. 3B is a diagram showing another structure of Modification Example 1.

In addition, as shown in the first embodiment, it is also possible to use the structure shown in FIG. 3B with regard to the present modification. The actions are identical to those described in the case of FIG. 1B.

Modification Example 2

Figure 4A:
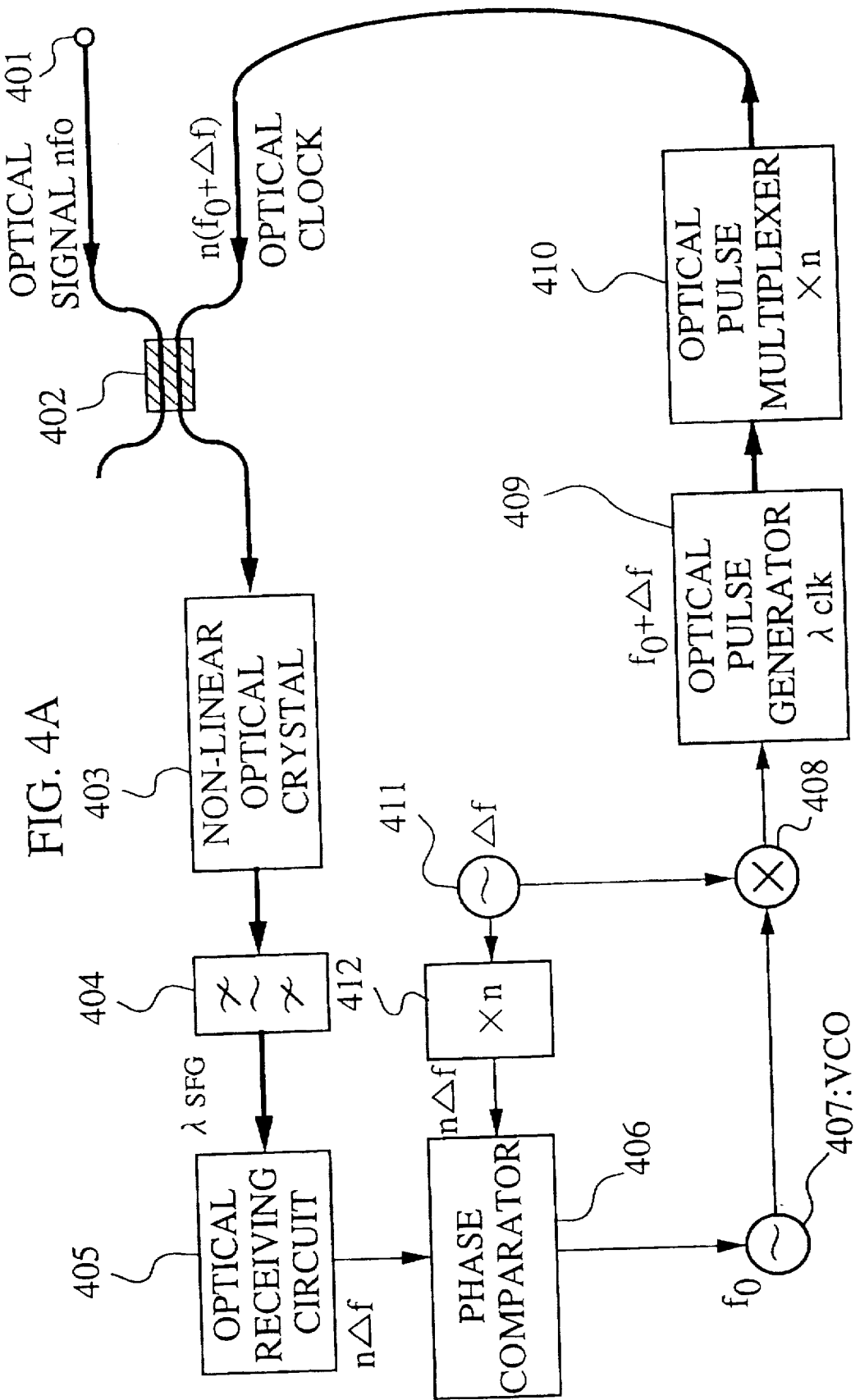
FIG. 4A is a diagram showing a structure of Modification Example 2 according to a first embodiment.

FIG. 4A is a diagram showing another modification of the first embodiment. In this Figure, optical signal input terminal 401, optical coupler 402, non-linear optical crystal 403, optical bandpass filter 404, optical receiving circuit 405, phase comparator 406, VCO 407, micro-wave mixer 408, optical pulse generator 409, optical pulse multiplexer 410, low frequency oscillator 411, and frequency multiplier 412 are provided.

In the present Modification Example, the sum-frequency generation phenomenon in non-linear optical crystal is used as the optical modulating means. This sum frequency generation phenomenon outputs, at the time when two types of light of optical wavelengths v1 and v2 are incident into the nonlinear optical crystal, a light of an optical frequency of the sum of both lights at a magnitude in proportion to the product of the intensities of the incident two lights. Details of this phenomenon can be found by referencing H. Takara, et al., ("Ultra-high-speed optical waveform measurement method using optical sampling with sum-frequency generation (in Japanese), *Denshi Jouhou Tsushin Gakkai Ronbunshi* B-1, J75-B-1; pp. 372–380: 1992). With regard to this phenomenon, the optical frequency of the correlation signal generated becomes (v1+v2), e.g., in the case when two lights measuring 1.55 μm and 1.3 μm, results in a sum frequency light of 0.7 μm. In the case of four-wave mixing described in the aforementioned first and second embodiments, it is necessary for the wavelengths of the incident two lights to lie within approximately 10 nm of each other, and the wavelength of the output light is also at position within approximately 10 nm of the incident lights. In contrast, in the sum-frequency generation, it is possible to achieve this sum-frequency generation over a wider wavelength range than in the case of four-wave mixing, by means of adjusting the angles of incidence and the like of the lights into the crystal, e.g., as shown by the lights of 1.55 μm and 1.3 μm. As the non-linear optical crystal, any material capable of achieving sum-frequency generation, such as $LiIO_3$, $LiNbO_3$, KTP, $KNbO_3$, and the like can be used as mentioned in the above-referenced document. Since the sum-frequency light generated possesses the exact same correlation component as the four-wave mixing light, PLL can be achieved as in the first and second embodiments by converting the aforementioned into an electrical signal and then conducting feedback to the VCO.

Figure 4B:
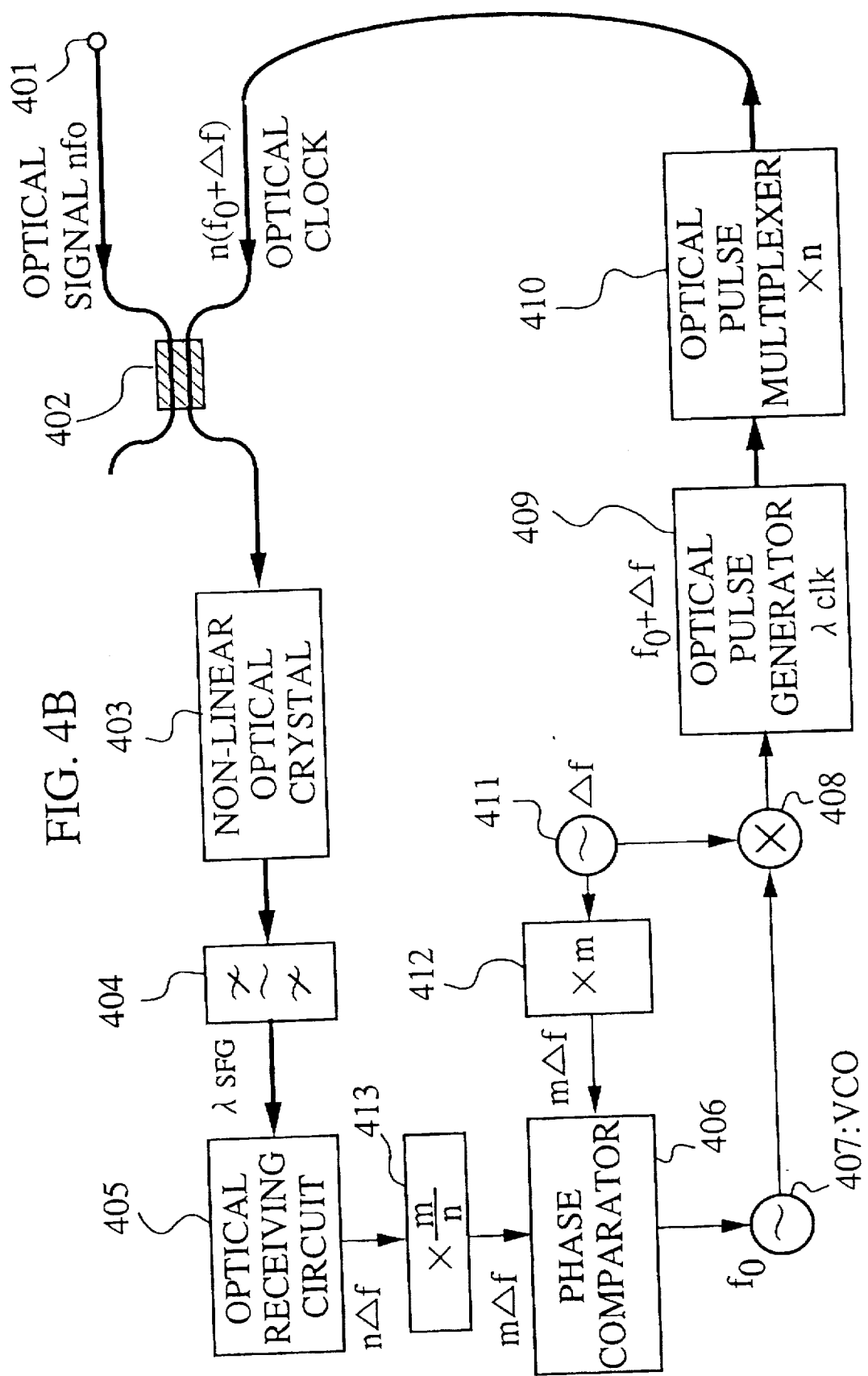
FIG. 4B is a diagram showing another structure of Modification Example 2.

In addition, as shown in the first embodiment, it is also possible to use the structure shown in FIG. 4B with regard to the present modification. The actions are identical to those described in the case of FIG. 1B.

Modification Example 3

Figure 5A:
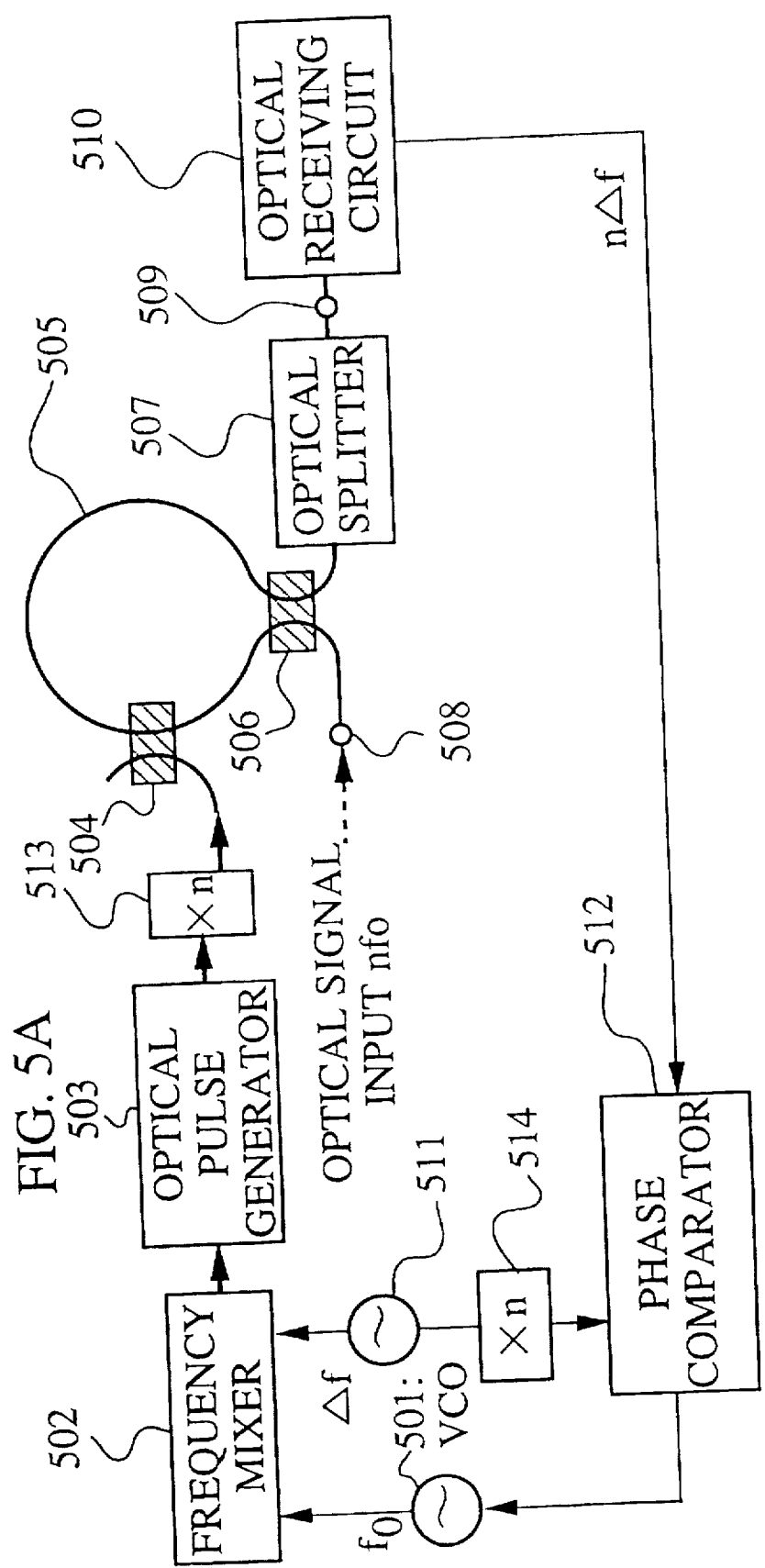
FIG. 5A is a diagram showing a structure of Modification Example 3 according to a first embodiment.

FIG. 5A is a diagram showing another modification of the first embodiment. In this Figure, voltage-controlled oscillator 501, mixer 502, optical pulse generator 503, optical coupler 504, optical fiber 505, optical coupler 506, optical splitter 507, optical signal input port 508, optical output port 509, optical receiving circuit 510, low frequency oscillator 511, phase comparator 512, optical pulse multiplexer 513, and frequency multiplying circuit 514 are provided.

In the following, the actions of the present invention will be explained in accordance with the present modification. Initially, the optical signal pulse series is inputted into optical coupler 506 from input terminal 508. With regard to optical coupler 506, the branching ratio of the light intensity is set to 1:1. The optical signal inputted from input terminal 508 is then divided into 2 by means of optical coupler 506, and after propagating over the same route in both directions, the optical signal returns to optical coupler 506 in the same phase, and then exits from incident port 508. When an optical control pulse enters via optical coupler 504, the control light propagates only in the clockwise direction of the Figure over a loop constructed by means of optical fiber 505. Hence, the optical signal propagating reciprocally in the inverse direction over the same loop undergoes a phase shift of a different quantity by means of a non-linear optical effect (optical Kerr effect) from the control light. As a result, when the aforementioned returns to optical coupler 506, the phase balance of both lights is destroyed. A portion of the signal light then exits through another port of optical coupler 506 in response to this phase difference, passes through optical splitter 507, and is outputted from output port 509. In other words, calculation of the product of the optical signal pulse and optical control pulse is conducted by means of the loop comprising optical fiber 505, optical coupler 504, and optical coupler 506.

The output optical waveform at the time when both of the aforementioned lights enter the optical non-linear loop mirror formed from coupler 504, coupler 506, and fiber 505 is provided by means of the product of the intensities of both lights. In the output light from this loop mirror, a repetition frequency as described in the aforementioned first embodiment is generated as the n$\Delta$f component, and thus PLL operation can be achieved according to the same operational principles as in the first embodiment. In the present embodiment, ultra-high-speed optical PLL can be achieved due to the use of ultra-high-speed optical Kerr effect as the optical modulating means.

Figure 5B:
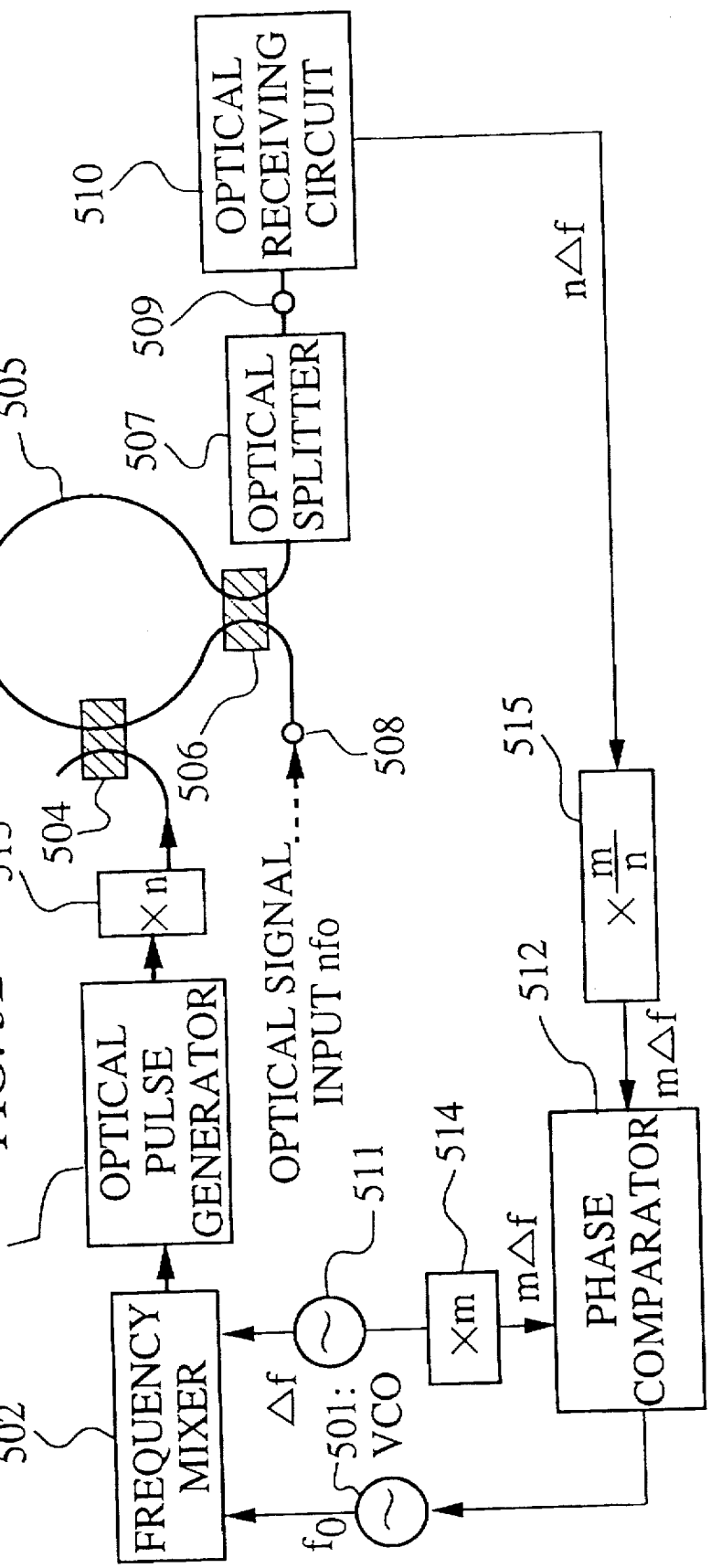
FIG. 5B is a diagram showing another structure of Modification Example 3.

In addition, as shown in the first embodiment, it is also possible to use the structure shown in FIG. 5B with regard to the present modification. The actions are identical to those described in the case of FIG. 1B.

Second Embodiment

Figure 6A:
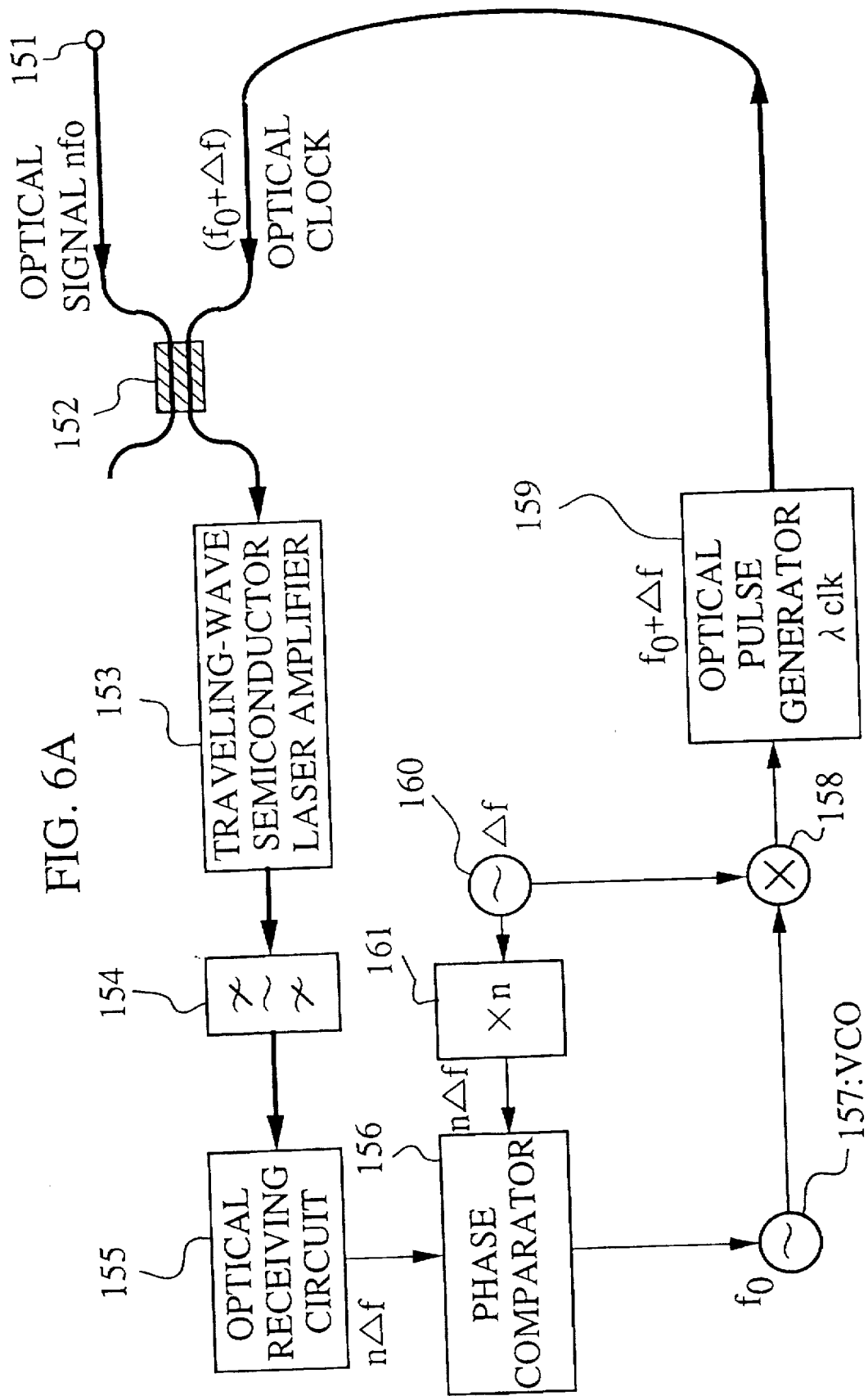
FIG. 6A is a diagram showing a structure of a second embodiment according to the present invention.

FIG. 6A is a diagram showing a structure according to the second embodiment of the present invention. In this Figure, optical signal input terminal 151, optical coupler 152, traveling-wave semiconductor laser amplifier 153, optical band pass filter 154, optical receiving circuit 155, phase comparator 156, voltage-controlled oscillator 157 (VCO), micro-wave mixer 158, optical pulse generator 159, low frequency oscillator 160, and frequency multiplier 161 are provided. The oscillation frequency $f_0$ of VCO 157 is set such that the bit rate of the optical signal inputted from optical signal input terminal 151 becomes $nf_0$ (n is an integer of at least 1).

In the following, the operation of the present embodiment will be explained. The output signal of VCO 157 undergoes a frequency shift by means of low frequency oscillator 160 and micro-wave mixer 158, and then drives optical pulse generator 159. The repetition frequency then generates an optical clock pulse of $f_0+\Delta f$ (or $f_0-\Delta f$, or $f_0\pm\Delta f$). As the waveform of the optical clock pulse in the present invention, it is necessary to include a harmonics component in order to cope with the narrow pulse width, rather than using a sine wave. Assuming that the time waveform Pc(t) of the optical pulse series generated is Gaussian-shaped, then the following formula expresses this time waveform Pc(t).

$$PC\ (t) = \Sigma A \exp\{-\alpha\ (t+kT)^2\} \tag{6}$$

In the above formula, $\Sigma$ is an operator signifying the overall sum with respect to $k=-\infty\rightarrow+\infty$. In addition, A and $\alpha$ represent constants, and $T=1/(f_0+\Delta f)$. When expanding Pc(t) into a Fourier series, the following formula results.

$$Pc\ (t) = a\ [1+2\Sigma \exp\{-(1/\alpha)(n\pi/T)^2\}\cdot\cos\{n\cdot 2\pi(f_0+\Delta f)\ t\}] \tag{7}$$

In the above equation, $\Sigma$ is an operator signifying the overall sum with respect to $n=1\rightarrow+\infty$. In Formula (7), an $n\times$ harmonics component n $(f_0+\Delta f)$ exists in the second item. This nth harmonics component decreases with increasing n due to the reduction of the coefficient. However, when the pulse width is narrow (i.e., $\alpha$ is small), the coefficient becomes large, and thus it is possible to generate the nth harmonics.

Figure 7:
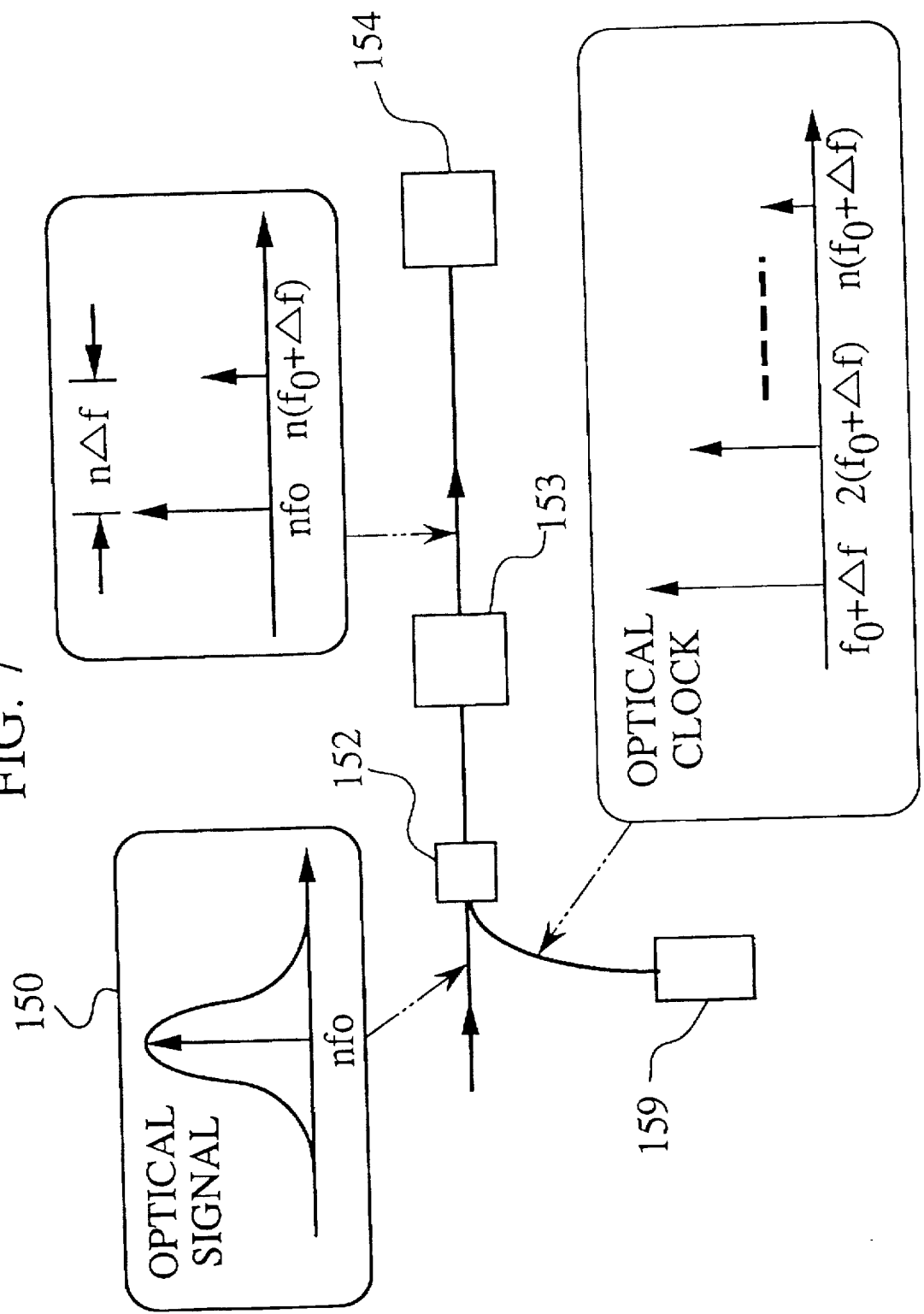
FIG. 7 is a diagram showing the spectrum of the optical signal and clock pulse inputted into optical coupler 102, and the spectrum of the output light of traveling-wave semiconductor laser amplifier 103.
Figure 11:
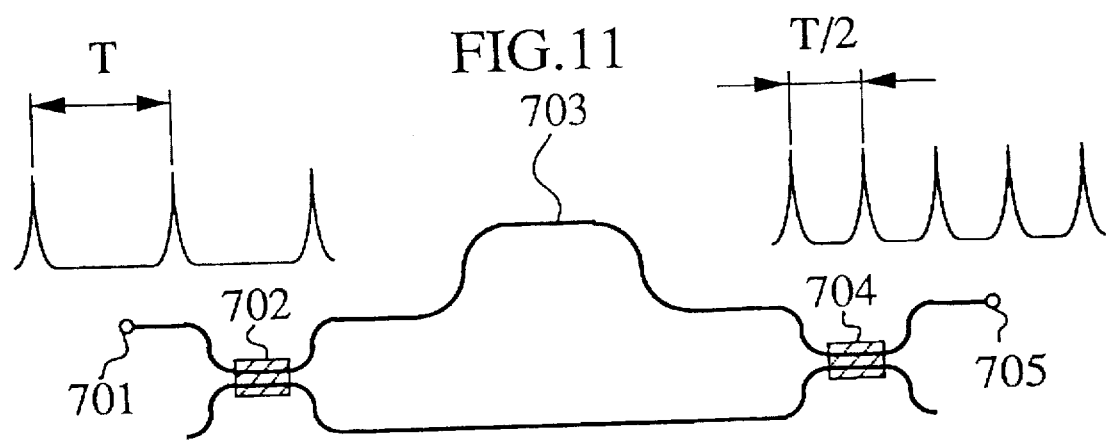
FIG. 11 is a structural diagram showing a 2× multiplexer of an optical clock using an optical fiber.
Figure 12:
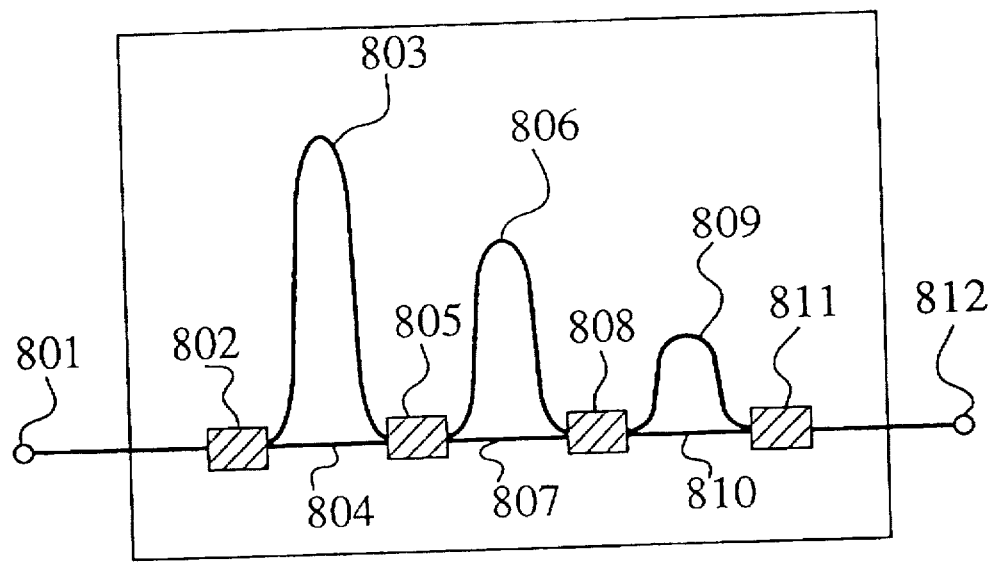
FIG. 12 is a structural diagram showing a three-stage 8× optical pulse multiplexer using an optical wave guide.

In the present embodiment, since the n$\Delta$f component is generated by means of detecting the correlation between this nth harmonics n($f_0+\Delta f$) and optical signal component, the optical time division multiplexing circuit shown in FIGS. 11 and 12 is not necessary. In order to generate a correlation signal of a sufficient level with respect to an optical signal of a high bit rate, it is necessary for the clock pulse produced to possess a narrow pulse width. At present, use of a gain switched semiconductor laser, mode locked laser, or the like as the ultra-short optical pulse light source, allows the production of an optical pulse with a pulse width of 5 ps or less: Using this optical pulse, it is possible to conduct correlation detection even with regard to an optical signal of 100 Gbit/s or more. FIG. 7 shows a spectrum of an optical signal and clock pulse inputted into optical coupler 152, and a spectrum of the optical output of traveling wave semiconductor laser amplifier 153.

The operation of traveling wave semiconductor laser amplifier 153 which serves as the optical correlation detecting means is identical to the that of the structure described in FIGS. 1, 2A, and 2B of the first embodiment. In the case when wavelength $\lambda_{sig}$ of the optical signal and wavelength $\lambda_{clk}$ of the optical clock entering into traveling wave semiconductor laser amplifier 153 are close enough to coherently interfere, a component corresponding to the correlation of both lights is generated at a new wavelength $\lambda_{FWM}$ by means of four-wave mixing generated between the optical signal and optical clock within the semiconductor laser.

The light generated either by an optical signal undergoing gain modulation or by means of four-wave mixing includes the correlation component of both lights (h$\Delta$f). Therefore, after extracting the aforementioned optical signal or four-wave mixing light by means of optical bandpass filter 154, PLL operation can be achieved in the same manner as the conventional art by converting either of the aforementioned into an electrical signal using optical receiving circuit 155, and with regard to the nΔf component therein, comparing a standard signal with n-multiplied nΔf signal by means of phase comparator 156, and then conducting feedback of this output to VCO.

Figure 6B:
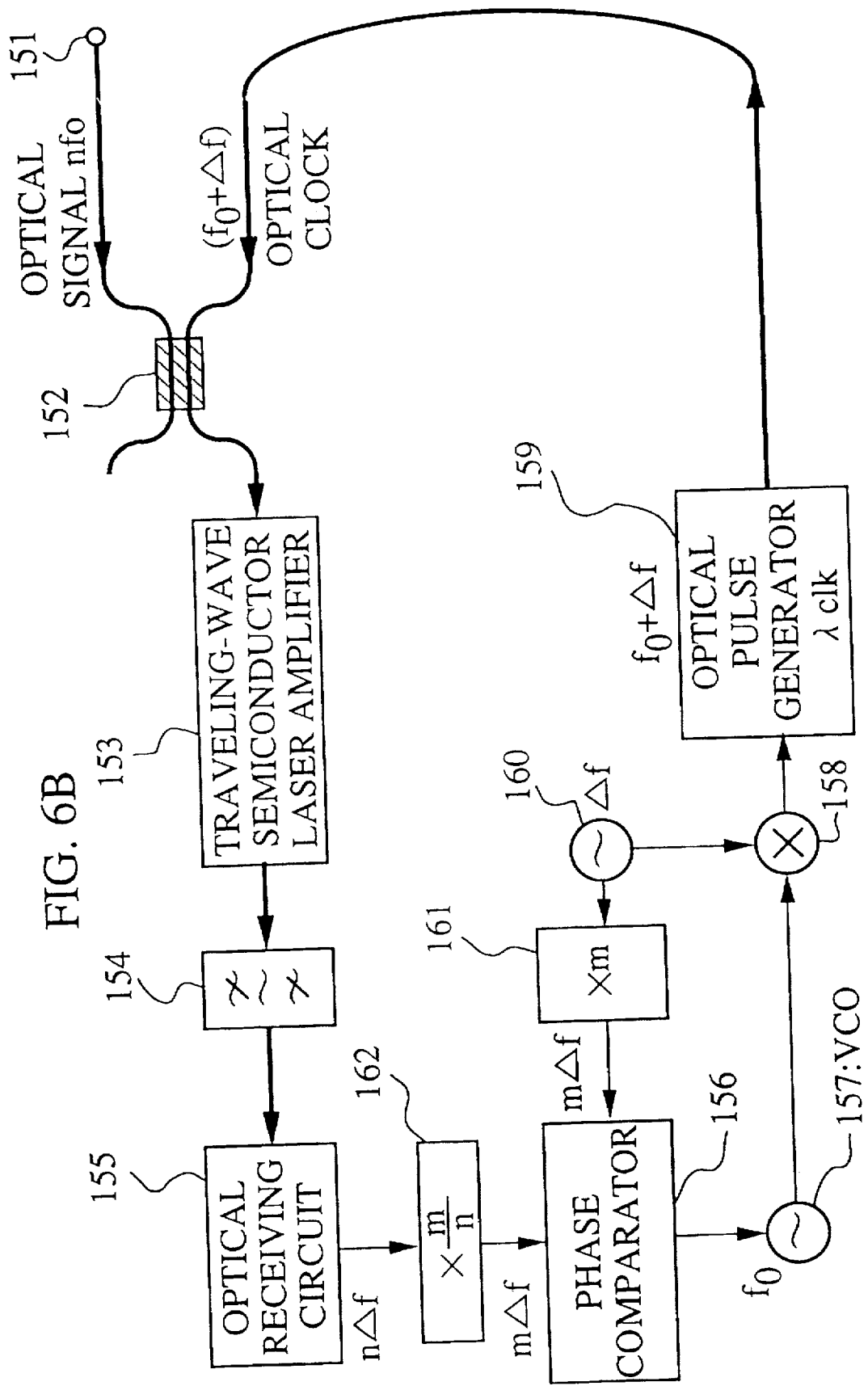
FIG. 6B is a diagram showing another structure of a second embodiment.

In addition, with regard to the action of phase comparator 156, it is also possible to use the circuit construction shown in FIG. 6B. In FIG. 6B, the output frequency of optical receiving circuit 155 is multiplied by m/n (m is a rational number) by means of dividing circuit 162, and both frequencies to be inputted into phase comparator 156 are compared to the phases of both lights as mΔf by means of multiplying the output of a.c. signal generator 160 by m. At this time, when m=1, frequency multiplying circuit 161 can be omitted, and when m=n, dividing circuit 162 can be omitted.

Modification Example 4

Figure 8A:
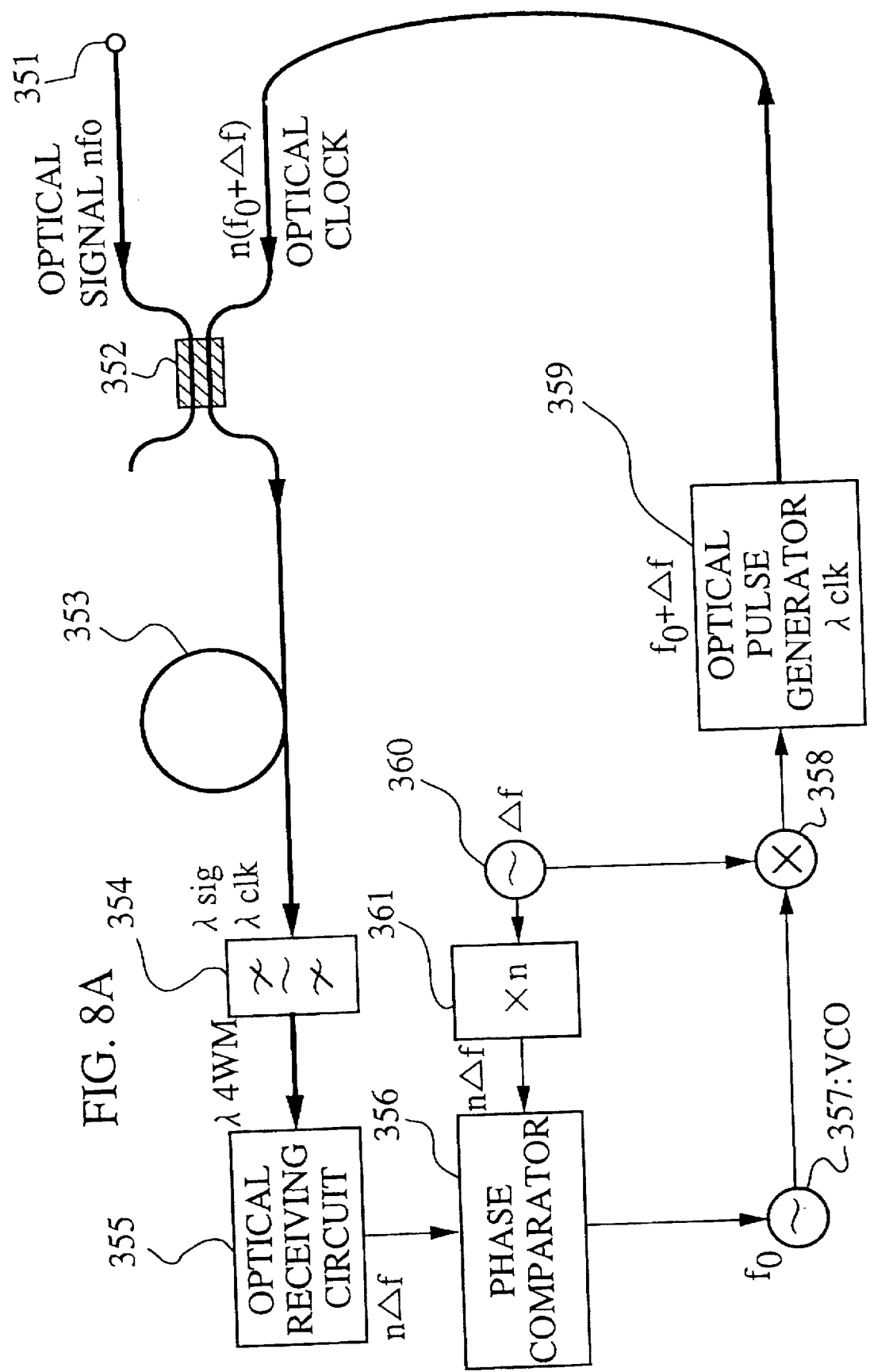
FIG. 8A is a diagram showing a structure of Modification Example 4 according to the second embodiment.

FIG. 8A is a diagram showing a modification of the second embodiment. In this Figure, optical signal input terminal 351, optical coupler 352, optical fiber 353, optical bandpass filter 354, optical receiving circuit 355, phase comparator 356, voltage-controlled oscillator 357 (VCO), micro-wave mixer 358, optical pulse generator 359, low frequency oscillator 360, and frequency multiplier 361 are provided.

In this present modification, optical fiber 353 is used as the medium for generating four-wave mixing. In the case of the present modification, it is possible to satisfy the phase matching conditions by means of setting the respective wavelengths of the optical signal and optical clock to within ±10 nm of the zero-dispersion wavelength of optical fiber 353. In this manner, four-wave mixing can then be generated in the same manner as in the traveling wave semiconductor laser amplifier, and hence PLL is subsequently achieved by means of the present structure.

Figure 8B:
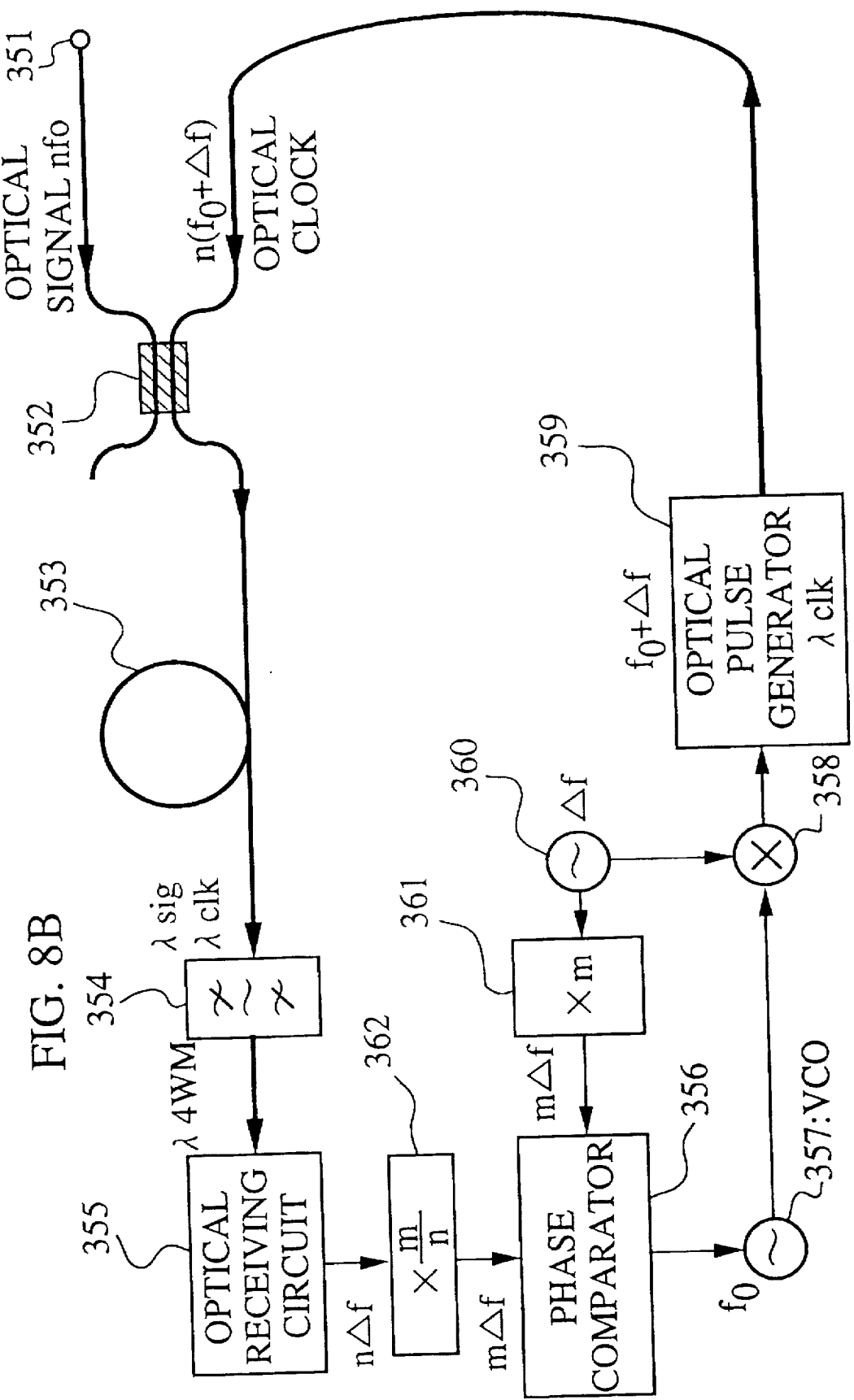
FIG. 8B is a diagram showing another structure of Modification Example 4.

In addition, as shown in the second embodiment, it is also possible to use the structure shown in FIG. 8B with regard to the present modification. The actions are identical to those described in the case of FIG. 6B.

Modification Example 5

Figure 9A:
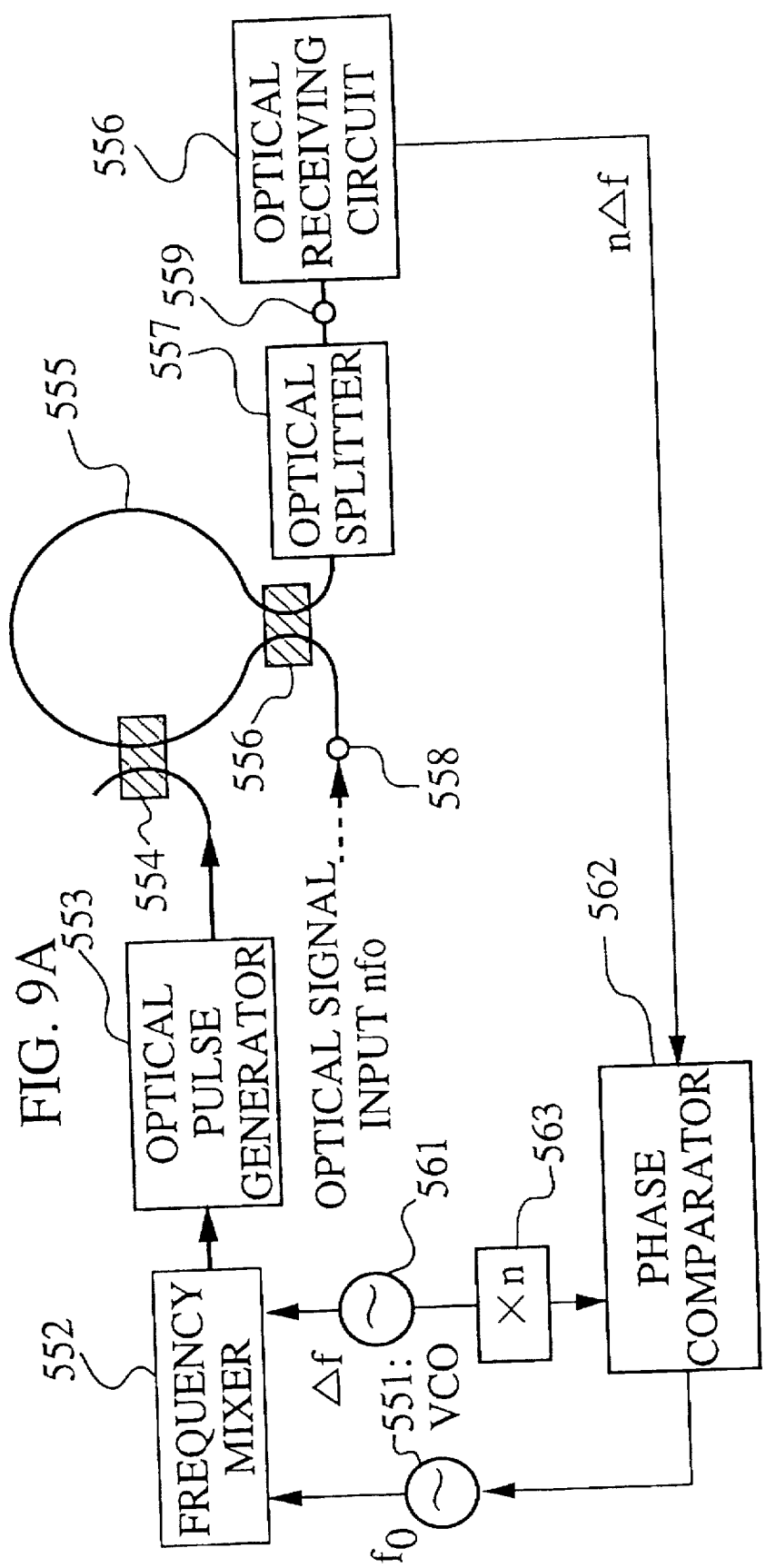
FIG. 9A is a diagram showing a structure of Modification Example 5 according to a second embodiment.

FIG. 9A is a diagram showing another modification of the second embodiment. In this Figure, voltage-controlled oscillator 551, mixer 552, optical pulse generator 553, optical coupler 554, optical fiber 555, optical coupler 556, optical splitter 557, optical signal input port 558, optical output port 559, optical receiving circuit 560, low frequency oscillator 561, phase comparator 562, and frequency multiplying circuit 563 are provided.

In this present modification, since an optical clock pulse incorporating the nth-higher harmonic wave component light is generated from pulse generator 553 as in the second embodiment, an optical time division multiplexing circuit is unnecessary. With the exception of this aforementioned point, the remaining operation is conducted in the same manner as in Modification Example 3.

In other words, the optical output waveform at the time when the optical signal pulse and optical control pulse enter an optical non-linear loop mirror formed by means of couplers 554 and 556 and fiber 555, is provided by means of the product of the light intensities of both lights. In the same manner as in the first embodiment, in the optical output from this aforementioned loop mirror, the nΔf component is generated by the repetition. frequency, and thus, PLL operation is achieved by means of the same operational principle as in the first embodiment. In the present modification, ultra-high-speed optical Kerr effect is used as the optical correlation detecting means, and thus the realization of ultra-high-speed optical PLL can be anticipated.

Figure 9B:
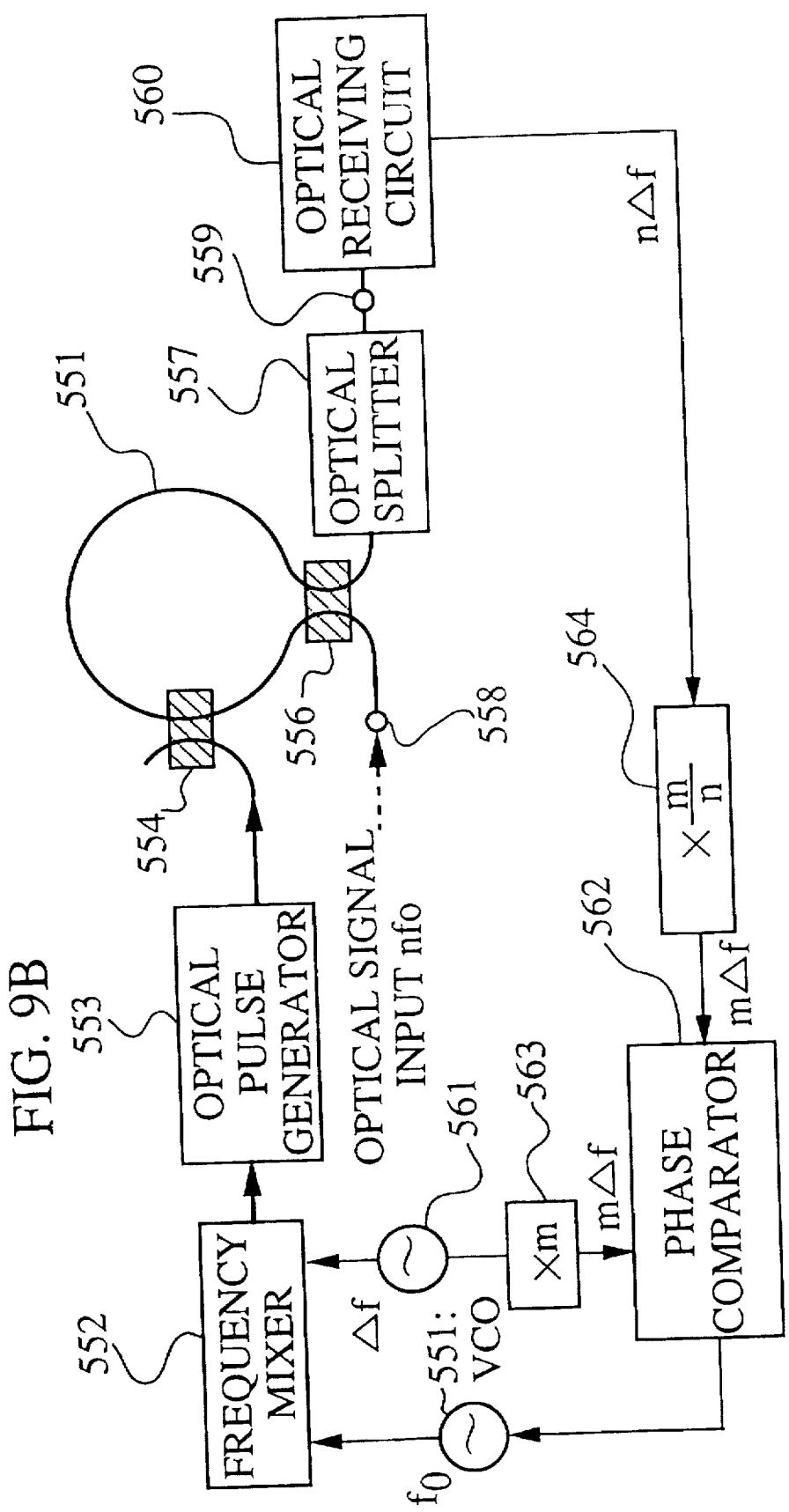
FIG. 9B is a diagram showing another structure of Modification Example 5.

In addition, as shown in the second embodiment, it is also possible to use the structure shown in FIG. 9B with regard to the present modification. The actions are identical to those described in the case of FIG. 6B.

Modification Example 6

Figure 13:
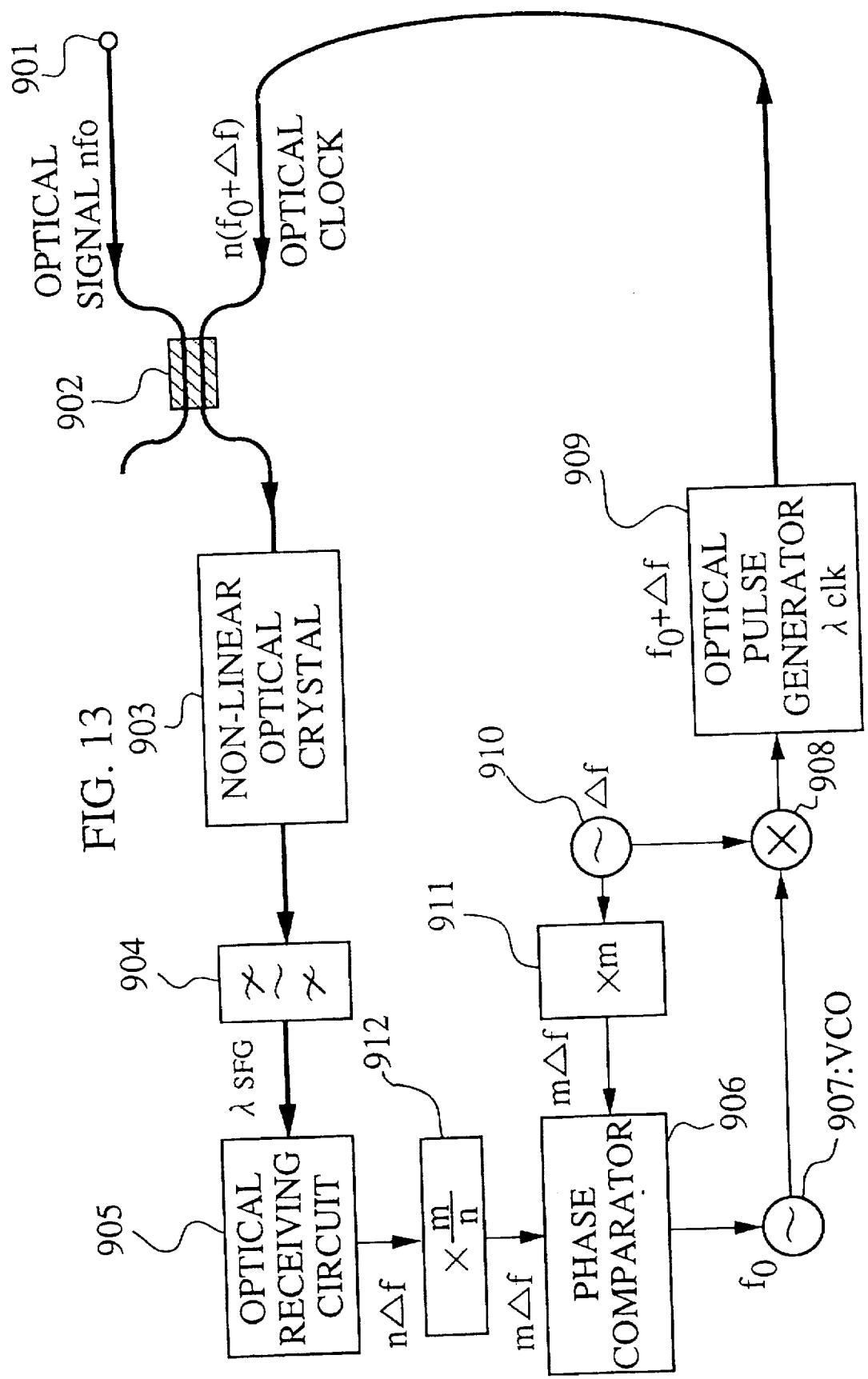
FIG. 13 is a diagram showing a structure of Modification Example 6 according to a second embodiment.

FIG. 13 is a diagram showing another modification of the second embodiment. In this Figure, optical signal input terminal 901, optical coupler 902, non-linear optical crystal 903, optical bandpass filter 904, optical receiving circuit 905, phase comparator 906, VCO 907, microwave mixer 908, optical pulse generator 909, low frequency oscillator 910, frequency multiplier 911, and dividing circuit 912 are provided.

In the present Modification Example, the optical sum-frequency generation phenomenon of a non-linear optical crystal described in Modification Example 2 is used as the optical modulating means. The actions are identical to those described in the case of FIG. 6B.

What is claimed is:

1. Optical correlation detecting circuit comprising:
   optical combining means for combining an optical signal pulse and an optical clock pulse possessing a sufficiently narrow pulse width including nth harmonics, n being a natural number, component of a repetition frequency;
   optical non-linear loop mirror means for outputting a product of intensities of said optical signal pulse and said optical clock pulse; and
   optical splitting means for extracting from an optical output signal of said optical non-linear loop mirror means only a correlation component of said optical signal pulse and said optical clock pulse.

2. Optical correlation detecting circuit as recited in claim 1, wherein said optical signal pulse and said optical clock pulse are lights of wavelengths that coherently interfere with each other.

3. Optical correlation detecting circuit as recited in claim 1, wherein said optical signal pulse and said optical clock pulse are lights of wavelengths that coherently interfere with each other; and a correlation component of a coherent light is generated.

4. Optical correlation detecting circuit as recited in claim 1, wherein a gain with respect to an optical signal pulse of said optical non-linear loop mirror means is modulated using the intensity of an optical clock; and said correlation component being an optical signal undergoing intensity modulation.

5. Optical correlation detecting circuit as recited in claim 1, wherein said correlation component of said optical signal pulse and said optical clock pulse is a four-wave mixing light generated in said optical non-linear loop mirror means.

6. Optical correlation detecting circuit comprising:
   optical combining means for combining an optical signal pulse and an optical clock pulse possessing a sufficiently narrow pulse width including nth harmonics, n being a natural number, component of a repetition frequency;
   optical fiber for outputting a product of intensities of said optical signal pulse and said optical clock pulse; and
   optical splitting means for extracting from an optical output signal of said optical fiber only a correlation component of said optical signal pulse and said optical clock pulse;

wherein, said optical signal and said optical clock respectively possess wavelengths in a vicinity of a zero dispersion wavelength of said optical fiber.

7. Optical correlation detecting circuit comprising:

optical combining means for combining an optical signal pulse and an optical clock pulse possessing a sufficiently narrow pulse width including nth harmonics, n being a natural number, component of a repetition frequency;

optical fiber for outputting a product of intensities of said optical signal pulse and said optical clock pulse; and optical splitting means for extracting from an optical output signal of said optical fiber only a correlation component of said optical signal pulse and said optical clock pulse;

wherein a loop is formed by optically coupling said optical combining means, said optical fiber, and said optical splitting mean, and wherein said optical combining means separately includes a means for receiving said optical signal pulse and means for receiving said optical clock pulse.

* * * * *

UNITED STATES PATENT AND TRADEMARK OFFICE
CERTIFICATE OF CORRECTION

PATENT NO. : 5,706,113
DATED : January 06, 1998
INVENTOR(S) : Satoki KAWANISHI et al.

It is certified that error appears in the above-identified patent and that said Letters Patent is hereby corrected as shown below:

In Claim 7, column 14, line 7, "mean" should read --means--.

Signed and Sealed this

Eighteenth Day of May, 1999

Attest:

Q. TODD DICKINSON

*Attesting Officer*    *Acting Commissioner of Patents and Trademarks*